United States Patent
Lennon et al.

(10) Patent No.: US 12,188,158 B2
(45) Date of Patent: Jan. 7, 2025

(54) METHOD OF MAKING UNIFORM SPUNBOND FILAMENT NONWOVEN WEBS

(71) Applicant: Kimberly-Clark Worldwide, Inc., Neenah, WI (US)

(72) Inventors: Eric E. Lennon, Roswell, GA (US); Bryan D. Haynes, Jasper, GA (US); Sara Honarbakhsh, Alpharetta, GA (US); Craig A. Barnes, Cumming, GA (US); David A. Palzewicz, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 198 days.

(21) Appl. No.: 17/791,516

(22) PCT Filed: Jan. 31, 2020

(86) PCT No.: PCT/US2020/016168
§ 371 (c)(1),
(2) Date: Jul. 7, 2022

(87) PCT Pub. No.: WO2021/141610
PCT Pub. Date: Jul. 15, 2021

(65) Prior Publication Data
US 2023/0033920 A1 Feb. 2, 2023

Related U.S. Application Data

(63) Continuation-in-part of application No. PCT/US2020/013143, filed on Jan. 10, 2020.

(51) Int. Cl.
B29C 48/05 (2019.01)
B29C 48/30 (2019.01)
(Continued)

(52) U.S. Cl.
CPC ............ *D01F 6/06* (2013.01); *B29C 48/3001* (2019.02); *B29C 48/3003* (2019.02); *D01D 4/02* (2013.01);
(Continued)

(58) Field of Classification Search
CPC ..... B29C 48/05; B29C 48/30; B29C 48/3001; B29C 48/3003; D01D 4/02; D01D 4/022;
(Continued)

(56) References Cited

U.S. PATENT DOCUMENTS 3,283,616 A * 11/1966 Balcenik ................ D01D 4/022
76/107.6
3,360,597 A 12/1967 Jones et al.
(Continued)

FOREIGN PATENT DOCUMENTS

| CN | 1386147 A | 12/2002 |
|---|---|---|
| CN | 102414799 A | 4/2012 |

(Continued)

OTHER PUBLICATIONS

Hills, Inc, "Hills Technology Vs Conventional Technology", http://www.hillsinc.net/assets/pdfs/hills-technology-conventional-technology.pdf.
(Continued)

*Primary Examiner* — Leo B Tentoni

(57) ABSTRACT

A method of making nonwoven webs comprising providing a spinneret including a pattern of conduits forming an extrusion region; directing only a first stream of molten propylene polymer into a region adjacent the first side of the spinneret, directing only a second stream of molten propylene polymer into a region distal to the first side of the spinneret, extruding only the first stream propylene polymer through the exit openings in a first zone where the exit opening comprises exit ports in the first zone having a first
(Continued)

density; extruding only the second stream propylene polymer through the exit openings of a second zone where the exit opening comprises exit ports in the second zone having a second density less than the first density; and the second zone is distal to the first side with the first zone being between the second zone and the first side.

20 Claims, 12 Drawing Sheets

(51) Int. Cl.
| | |
|---|---|
| *D01D 4/02* | (2006.01) |
| *D01D 4/06* | (2006.01) |
| *D01D 5/088* | (2006.01) |
| *D01D 5/098* | (2006.01) |
| *D01D 7/00* | (2006.01) |
| *D01D 13/00* | (2006.01) |
| *D01F 6/06* | (2006.01) |
| *D04H 3/007* | (2012.01) |
| *D04H 3/147* | (2012.01) |
| *D04H 3/16* | (2006.01) |
| *D04H 3/016* | (2012.01) |

(52) U.S. Cl.
CPC ............... *D01D 4/022* (2013.01); *D01D 4/06* (2013.01); *D01D 5/088* (2013.01); *D01D 5/098* (2013.01); *D04H 3/007* (2013.01); *D04H 3/147* (2013.01); *D04H 3/16* (2013.01); *D04H 3/016* (2013.01); *D10B 2321/022* (2013.01); *D10B 2509/026* (2013.01)

(58) Field of Classification Search
CPC .......... D01D 4/06; D01D 5/088; D01D 5/098; D01D 5/0985; D01D 7/00; D01D 13/00; D01F 6/06; D04H 3/007; D04H 3/16; D10B 2321/022
USPC ......... 264/103, 211.12, 211.14, 555; 425/66, 425/72.2, 377, 378.2, 382.2, 461, 463, 425/464
See application file for complete search history.

(56) References Cited

U.S. PATENT DOCUMENTS

| | | |
|---|---|---|
| 3,458,616 A | 7/1969 | Guess, Jr. et al. |
| 3,509,244 A | 4/1970 | Cochrane, Jr. |
| 4,035,127 A | 7/1977 | Ogasawara et al. |
| 5,260,003 A | 11/1993 | Nyssen et al. |
| 5,407,651 A | 4/1995 | Kawai |
| 5,487,655 A | 1/1996 | Frey et al. |
| 5,728,407 A | 3/1998 | Matsui |
| 5,866,050 A | 2/1999 | Krauss et al. |
| 6,103,181 A | 8/2000 | Berger |
| 6,409,491 B1 | 6/2002 | Leffew et al. |
| 6,427,745 B1 | 8/2002 | Allen |
| 7,252,493 B1 | 8/2007 | Johnston et al. |
| 7,740,777 B2 | 6/2010 | Wilkie et al. |
| 2003/0042651 A1 | 3/2003 | Najour et al. |
| 2003/0052432 A1 | 3/2003 | Osaka et al. |
| 2003/0056883 A1 | 3/2003 | Bansal et al. |
| 2003/0203162 A1 | 10/2003 | Fenwick et al. |
| 2003/0236046 A1* | 12/2003 | Erickson ............... B29C 48/05 425/66 X |
| 2005/0241745 A1 | 11/2005 | Bansal |
| 2007/0216059 A1 | 9/2007 | Bentley et al. |
| 2008/0136054 A1 | 6/2008 | Fabbricante et al. |
| 2010/0099321 A1 | 4/2010 | Fare |
| 2011/0250378 A1 | 10/2011 | Eaton et al. |
| 2014/0103556 A1 | 4/2014 | Diaz De Leon Izquierdo et al. |
| 2016/0289864 A1 | 10/2016 | Park |
| 2016/0289865 A1 | 10/2016 | Park |
| 2019/0032215 A1 | 1/2019 | Lo et al. |
| 2023/0033920 A1 | 2/2023 | Lennon et al. |

FOREIGN PATENT DOCUMENTS

| | | |
|---|---|---|
| CN | 202415761 U | 9/2012 |
| CN | 105473296 A | 4/2016 |
| CN | 106350874 A | 1/2017 |
| CN | 109309029 A | 2/2019 |
| DE | 10065859 A1 | 7/2002 |
| EP | 0722003 A2 | 7/1996 |
| WO | 2020097183 A1 | 5/2020 |

OTHER PUBLICATIONS

Retech, "Temperature controllers for heated godet rolls and other heating elements in the production process of synthetic filaments", May 15, 2017, http://www.retech-godet-rolls.ch/temperature-controllers.html.

Abandoned U.S. Appl. No. 16/675,894, filed Nov. 6, 2019, by Conrad et al. for "Method of Making Uniform Spunbond Filament Nonwoven Webs".

U.S. Appl. No. 17/291,452, filed May 5, 2021, by Conrad et al. for "Method of Making Uniform Spunbond Filament Nonwoven Webs".

\* cited by examiner

METHOD OF MAKING UNIFORM SPUNBOND FILAMENT NONWOVEN WEBS

This application claims the benefit of priority from Patent Cooperation Treaty Application PCT/US2020/013143 filed on 10 Jan. 2020, the contents of which are incorporated herein by reference.

BACKGROUND

Spunbond nonwoven fabrics comprise bonded webs of continuous filaments formed by extruding a molten thermoplastic polymer from a plurality of fine capillaries as molten filaments. The molten filaments are quenched to at least partially solidify them and then they are attenuated by one or more high velocity air streams which reduce their diameter. In addition to generating relatively fine filaments, the pneumatic drawing of the filaments in the spunbond process also acts to increase the crystallinity of certain polymers, such as propylene polymers, which provides the formed filaments and webs with increased tensile strength. By way of example, spunbond filament nonwoven webs and processes for making the same are disclosed in U.S. Pat. No. 4,340,563 to Appel et al, U.S. Pat. No. 5,382,400to Pike et al.; U.S. Pat. No. 8,246,898 to Conrad et al. and U.S. Pat. No. 8,333,918 to Lennon et al.

Spunbond filament nonwoven webs are commonly used in a wide range of products. The reason for this extensive and varied use in part relates to the ability of spunbond filament nonwoven webs to provide a desirable combination of properties including strength, opacity (coverage) and a pleasing hand-feel. Further, the cost of manufacture of spunbond filament webs is relatively low as compared to other materials with like properties such as traditional knitted or woven fabrics. As a result, spunbond filament nonwoven webs have been found to be particularly useful in relation to the manufacture of single-use or limited-use products; e.g. absorbent personal care products, wipes, protective apparel, geotextiles, tarpaulins, etc.

In order to further improve the costs of producing spunbond filament nonwoven webs, increasing the rate of production has been explored through the use of higher thru-put rates (i.e. increasing the grams of polymer per hole per minute) and also through the use of spinnerets having higher hole densities (i.e. increasing the number of filaments produced per unit area of the spinneret). However, as you increase the rate of production, this typically has resulted in a negative effect on one or more material properties such as hand-feel (e.g. formation of hard spots), filament diameter, filament uniformity, opacity and other visual properties. In addition, operating at higher production rates has also often negatively impacted the overall process stability such as resulting in a greater incidence of filament breaks and decreased yield.

Therefore, in order to address the continued desire for the production of uniform and high-quality spunbond filament nonwoven webs at still greater production rates, the present invention provides an improved process for the production of spunbond filament nonwoven webs that allows increased rates of production while minimizing and/or eliminating the loss of desired material properties and/or process stability.

SUMMARY

1. A method of making nonwoven webs comprising:
providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;

directing a first stream of molten propylene polymer having a first temperature into a region adjacent of the first side of the spinneret, directing a second stream of molten propylene polymer having the first temperature into a region distal to the first side of the spinneret;

extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side having a width of at least 3 cm, 4cm, 5 cm, 6 cm, 7 cm, 8 cm, 9 cm, 10 cm, 12 cm or 14 cm and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and has a width of at least 3 cm, 4 cm, 5 cm, 6 cm, 7 cm, 8 cm, 9 cm, 10 cm, 12 cm or 14 cm and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

FIGURES

DESCRIPTION

Figure 1A:
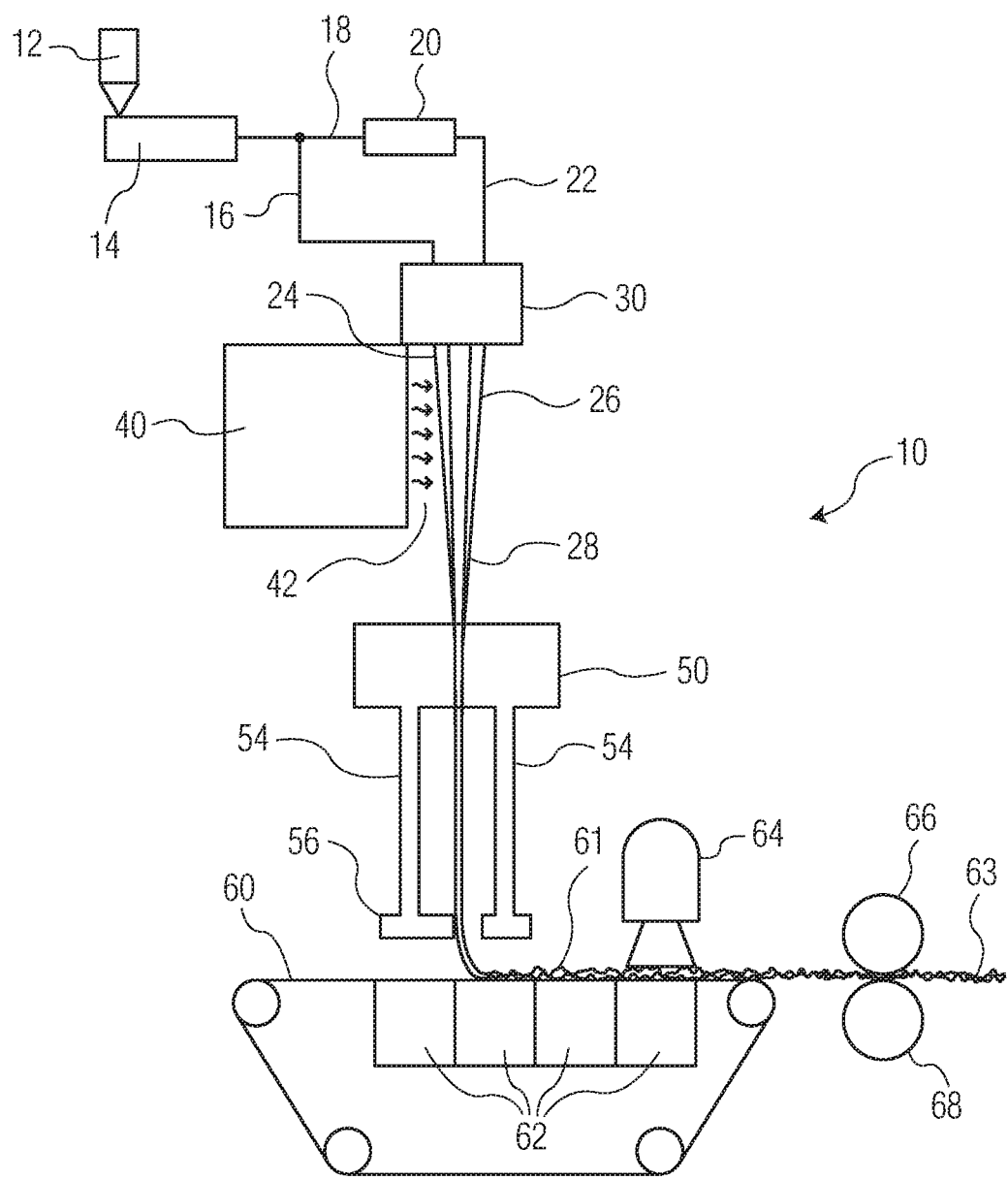
FIGS. 1A and 1B are schematic diagrams of spunbond filament nonwoven web manufacturing systems suitable for the production of spunbond filament nonwoven webs in accordance with the present invention.

Throughout the specification and claims, discussion of the articles and/or individual components thereof is with the understanding set forth below.

The term "comprising" or "including" or "having" are inclusive or open-ended and do not exclude additional unrecited elements, compositional components, or method steps. Accordingly, the terms "comprising" or "including" or "having" encompass the more restrictive terms "consisting essentially of" and "consisting of."

As used herein "continuous filaments" means filaments formed in a substantially continuous, uninterrupted manner having indefinite length and having a high aspect ratio (length to diameter) in excess of about 10,000:1.

As used herein, unless expressly indicated otherwise, when used in relation to material compositions, the terms "percent" or "%" refer to the quantity by weight of a component as a percentage of the total.

As used herein, the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein "ethylene polymer" or "polyethylene" means a polymer having greater than 50 mol. % units derived from ethylene.

As used herein "olefin polymer" or "polyolefin polymer" means a polymer having greater than 50 mol. % units derived from an alkene, including linear, branched or cyclic alkenes.

As used herein "propylene polymer" or "polypropylene" means a polymer having greater than 50 mol. % units derived from propylene.

As used herein, the term "nonwoven web" means a structure or a web of material that has been formed without use of traditional fabric forming processes such as weaving or knitting, to produce a structure of individual filaments or threads that are entangled or intermeshed, but not in an identifiable, repeating manner.

As used herein, the term "machine direction" or "MD" refers to the direction of travel of the forming surface onto which filaments are deposited during formation of a fibrous web.

As used herein, the term "cross-machine direction" or "CD" refers to the direction which is essentially perpendicular to the machine direction defined above.

As used herein "personal care articles" means any and all articles or products used for personal health or hygiene including diapers, adult incontinence garments, absorbent pants and garments, tampons, feminine pads and liners, bodily wipes (e.g. baby wipes, perineal wipes, hand wipes, etc.), bibs, changing pads, bandages, and components thereof.

As used herein "protection articles" means all articles intended to protect a user or equipment from contact with or exposure to external matter including, for example, face masks, protective gowns and aprons, gloves, caps, shoe covers, equipment covers, sterile wrap (e.g. for medical instruments), car covers, and so forth.

As used herein "melting point" means that determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. A heating rate of 10° C/minute is used.

Melt-Spinning Process

In reference to FIG. 1A, a system 10 is shown suitable form making nonwoven webs formed form melt-extruded, drawn filaments such as for example those commonly referred to as spunbond filament nonwoven webs. In one embodiment, the desired polymer composition, typically in the form of pellets, is provided in a hopper 12 and fed into an extruder 14 which melts the pellets and forms an initial stream of molten polymer. A portion of the molten polymer stream is directed to the spinning assembly 30 via piping 16. A separate portion of the molten polymer stream is directed via piping 18 through an additional heating element 20 which further heats the molten polymer and further increases the temperature of the same. The high temperature stream of molten polymer is separately directed to the spinning assembly 30 via piping 22.

The separate streams of molten polymer, i.e. the high and low temperature streams, may have an initial temperature differential of at least about 5° C. In a further aspect, the temperature differential of the high and low temperature streams may initially differ by an amount less than about 50° C. As examples, the temperature differential may be greater than about 8° C., 10° C., 12° C., 15° C. or even 18° C. As further examples, the temperature differential may be less than about 45° C., 42° C., 40° C., 38° C., 35° C., 30° C. or even 28° C. While suitable ranges will vary with particular polymers, generally speaking, in order to limit degradation or other undesired effects on the polymers, the molten polymer typically is not heated to a temperature more than about 150° C., 125° C., 100° C. or 75° C. greater than the melting point.

Figure 1B:
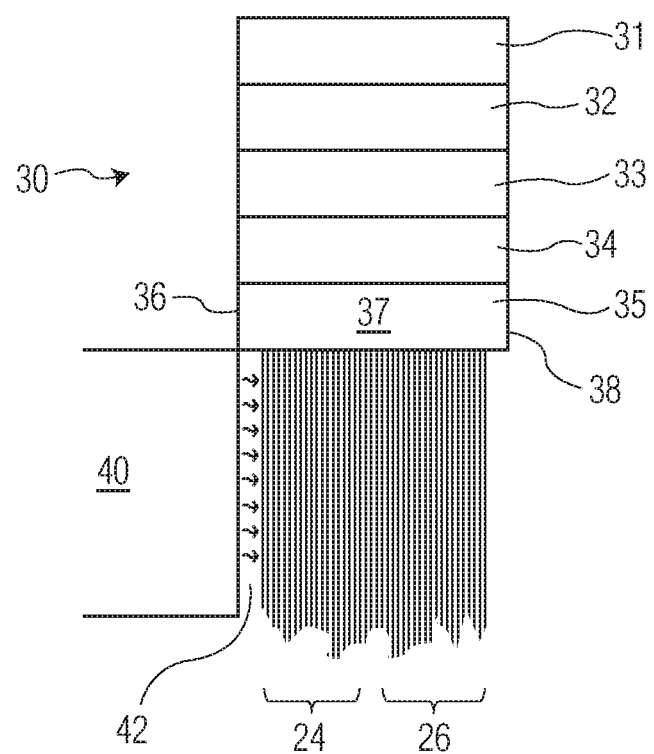
Figure 7A:
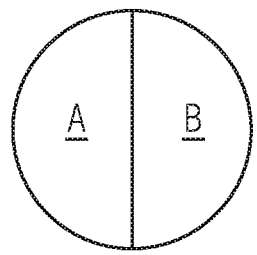
FIG. 7A, 7B and 7C are cross-sectional views of polymer streams suitable for use in connection with the present invention.

As shown in reference to FIG. 1B, in one embodiment, the spinning assembly 30 can include a polymer diverter 31, distributor 32, screen pack 33, support plate 34 and spinneret 35. The high and low temperature streams of molten polymer may initially be directed into a polymer diverter which acts to re-direct the two streams and bring them together to form a single stream. However, the two streams are brought together in a manner such that the two streams remain intact and distinct from one another, having a stable inter-face between them. The two polymer streams may be brought together and directed into a single conduit so as to be positioned in the conduit so as to be in a side-by-side arrangement such as an A/B arrangement as shown in FIG. 7A. Various different apparatus and methods are known to bring together molten polymer streams in this striped or layered configuration.

In one embodiment, a feeder block having a generally Y-shaped conduit may be used to bring the two streams together thereby forming a single unmixed, composite stream.

The composite stream of high and low temperature molten polymer can then be fed to a distributor 32 which acts to spread the molten polymer across a broader area ultimately for feeding into the spinneret 35. However, the distributor, in acting to expand the footprint of the composite stream must maintain the integrity of the polymer/polymer inter-face and/or integrity of the adjacent streams such that the high and low temperature molten polymers do not inter-mix. Various suitable distributors are known in the art including T-slot distributors, "coat-hanger" distributors and others as is well known in the art. By way of example only, various distributors are described in U.S. Pat. No. 7,179,412 to Wilkie et al. and CA2621712.

Optionally, albeit highly preferred, below the distributor 32 is a filter or screen 33 and a support member 34. The screen acts to filter impurities or other unwanted debris from the molten streams in order to prevent fouling of the spinneret such as by blocking one or more of the capillaries. Suitable screens may for example comprise one or more stacked screens ranging between about 50-350 mesh. Supporting the screen is a support member 34. Suitable support members may, for example, simply comprise a metal plate include a high number and frequency of apertures extending there through.

Figure 2A:
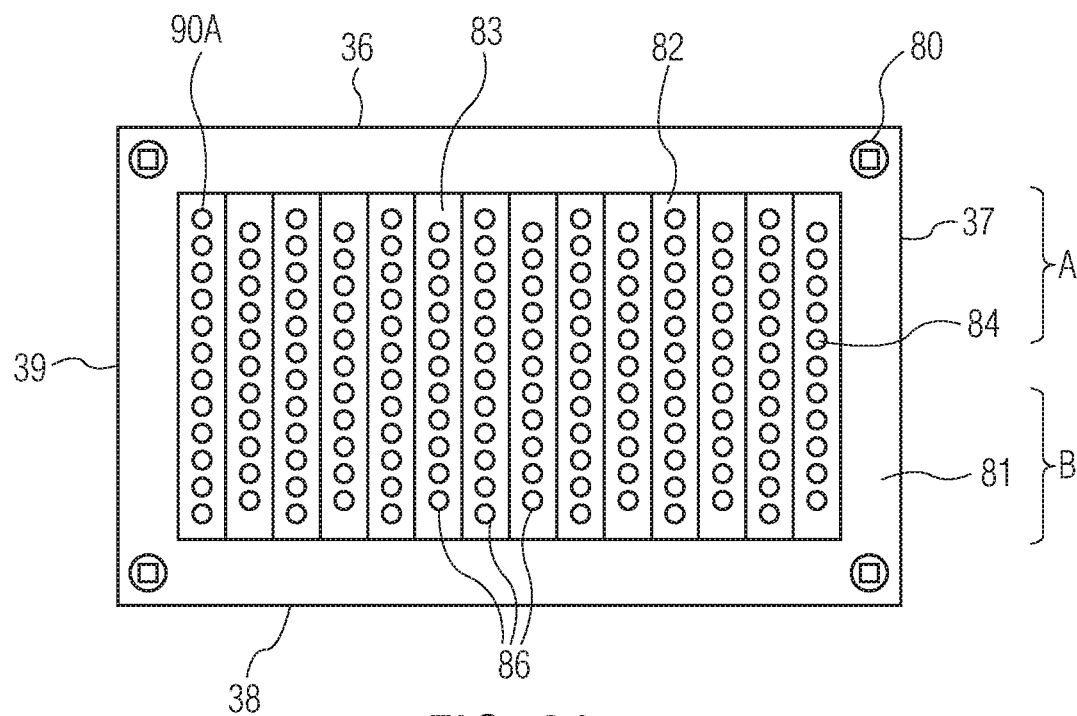
FIG. 2A is a top schematic view of a spinneret suitable for use in the present invention and in particular those described in FIG. 1.

The composite polymer stream remains in distinct segments as it passes through the screen 33 and support plate 34 and is fed into the spinneret 35. As shown in FIGS. 2 and 3, the spinneret 35 will often have, along its outer most perimeter, fasteners such as bolts, welds, brackets, clamps or other means for holding the spinneret adjacent and in fluid communication with the upstream components such as the breaker plate and/or screen. Bolt holes 80 and bolts 81 may be located about the perimeter to secure the spinneret 35 to the other components of the spinning assembly 30. The perimeter of the upper surface 81 can form a raised edge 82 that defines a depression or trough 83 for receiving the molten polymer. The spinneret includes a pattern of conduits 84 extending through the spinneret 35 wherein the composite polymer stream flows through the inlet openings 86, and from there through the associated capillary 87 and out of the associated exit port 89. The size of the exit ports can vary such as for example having a diameter between about 0.2 mm and about 0.8 mm. The pattern of conduits can vary in numerous respects and in many instances will comprise a series of rows of conduits extending alongside the CD or lengthwise sides 36, 38 of the spinneret. Conduits of adjacent rows typically will be off-set slightly from one another. The present invention is particularly well suited for use in connection with spinnerets having high density exit ports such as for example those having an exit port or hole density greater than about 5 exit ports per $cm^2$ such as, for example, those having a density of between about 5 and about 20 exit ports per $cm^2$, between about 8 and about 18 exit ports per $cm^2$ or even between about 10 and about 16 exit ports per $cm^2$.

Figure 2B:
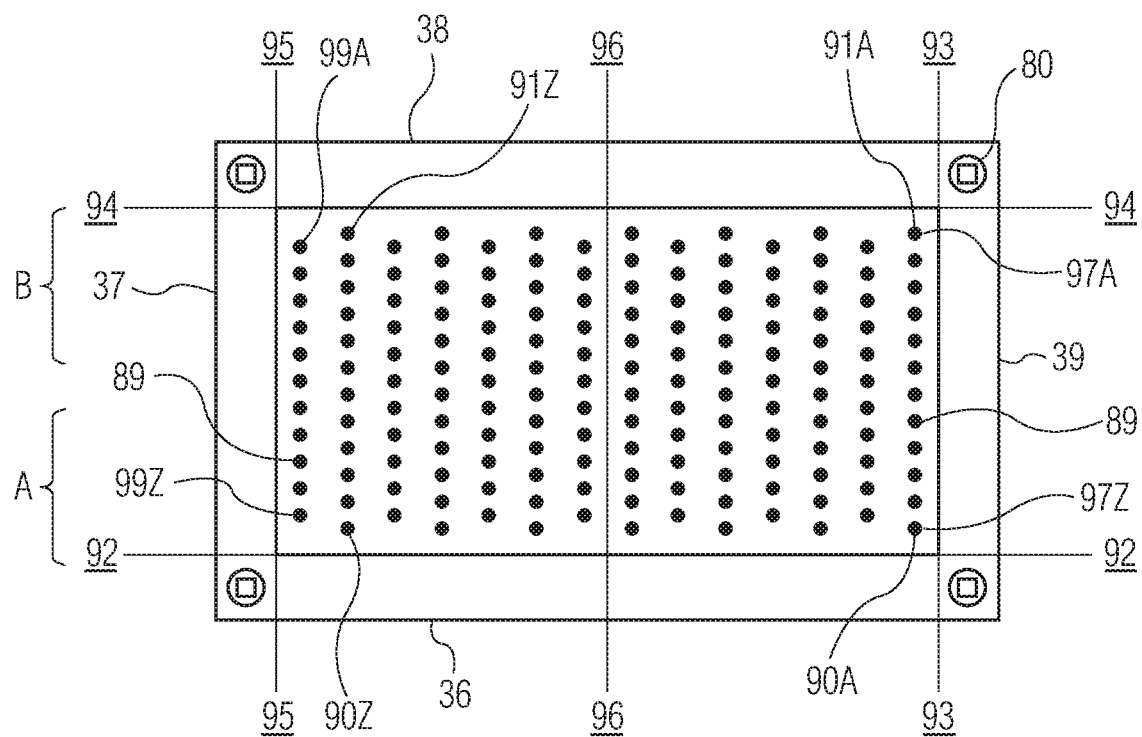
FIG. 2B is a bottom schematic view of the spinneret of FIG. 2A.
Figure 3:
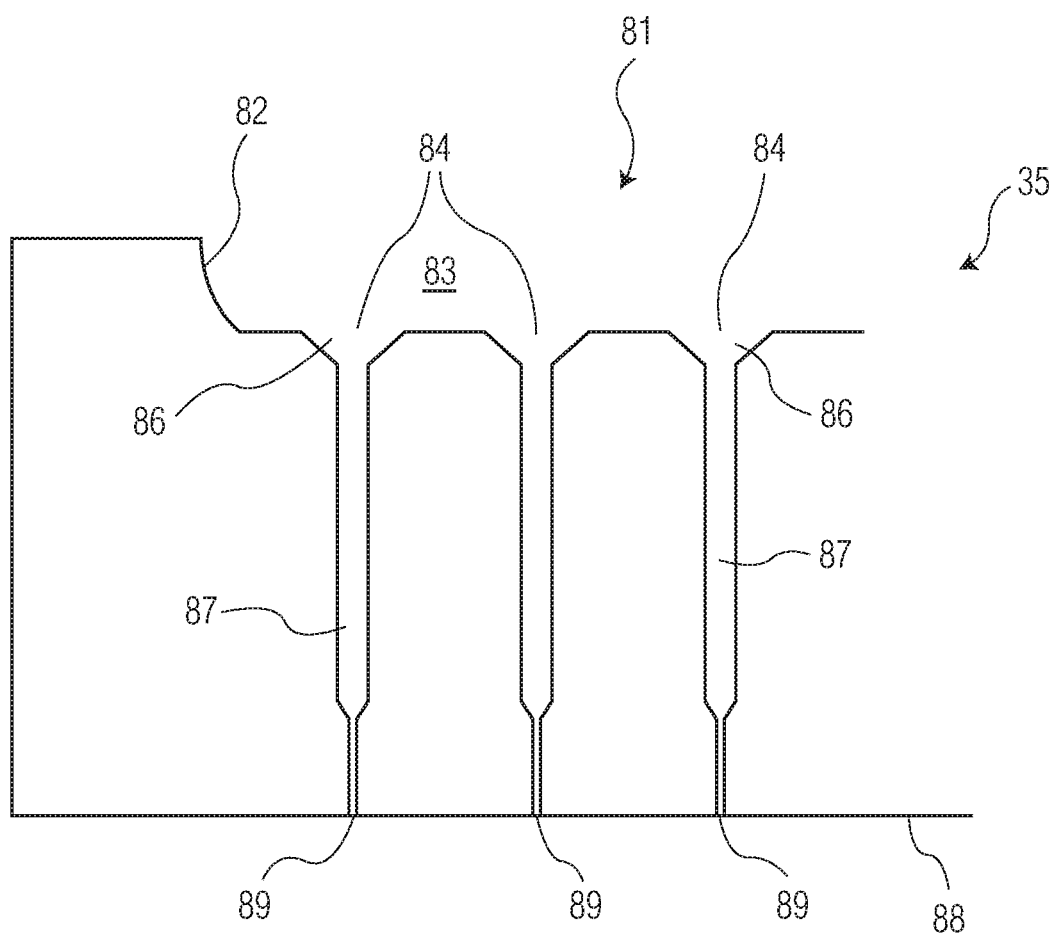
FIG. 3 is a cross-sectional schematic view of a portion of a spinneret suitable for use in connection with the present invention.

As best seen in FIG. 2B, the spinneret 58 includes a pattern of conduits 84 for directing the molten polymer through the spinneret 35 and out of the corresponding exit ports 89. The spinneret will present an extrusion area, namely an inner area of the spinneret that includes exit ports. The extrusion area is defined by first, second, third and fourth extrusion edge lines 92, 93, 94, 95. The first extrusion edge line 92 is drawn along the outer perimeter of the first row of exit ports 90A-90Z closest to and extending along the first lengthwise edge or quench side edge 36. Similarly, the second extrusion edge line 94 is drawn along the outer perimeter of the last row of exit port(s) 91A-91Z closest to and extending along the opposed second lengthwise edge 38. The third and fourth extrusion edge lines 93, 95 are drawn along the outer perimeter of the first and last columns of exit ports 97A-97Z, 91A-99Z closest to and extending along the first and second widthwise or MD edges 37, 39. The extrusion center line 96 of the spinneret is measured as the mid-point between the first and second extrusion edge lines 92, 94. The extrusion region width or CD width being the distance between opposed lengthwise extrusion lines 92, 94 along line 93 and the extrusion region length or MD length being the distance between extrusion lines 93, 95 along extrusion line 92.

In the present embodiment, the molten polymer is directed onto the upper surface 81 of the spinneret as distinct segments or bands covering distinct regions or zones. In this regard, only the high temperature molten polymer is directed into the first zone A and out of the corresponding exit ports within the first zone A. The low temperature polymer is the only polymer directed into the second zone B and out of the exit ports in the second zone B. However, it will be appreciated that at the inlet openings located at or about the polymer-to-polymer interface may take in and include some portion of both the high and low temperature polymers. Nevertheless, incorporation of both polymers into a single conduit and exit port will be limited and such filaments will comprise only an insignificant number of the filaments formed. The separate streams of molten polymer, i.e. the high and low temperature streams, may be introduced into the spinneret and/or extruded from the spinneret having a temperature differential of at least about 3° C. In a further aspect, the temperature differential of the high and low temperature streams may differ by an amount less than about 50° C. As examples, the temperature differential as the polymers enter and/or exit the spinneret may be greater than about 3° C., 5° C., 8° C., 10° C., 12° C., 15° C. or even 18° C. As further examples, the temperature differential may be less than about 45° C., 42° C., 40° C., 38° C., 35° C., 30° C. or even 28° C.

In reference to FIG. 2A and 2B, the high and low temperature polymer will be directed into and out of distinct zones within the spinneret. In certain embodiments, such as in a spunbond system directing quench air from a single direction (i.e. a single sided quench system), the high temperature polymer may be directed into a first zone A which includes all of the capillaries and/or exit ports within a certain distance of the first extrusion edge line 92. In certain embodiments, the first zone A may extend inwardly from the first extrusion edge line 92 a distance equal to or greater than 3 cm, 4 cm, 5 cm, 6 cm, 7 cm, 8 cm, 9 cm, 10 cm, 12 cm or 14 cm. Further, in various embodiments including single-sided quench embodiments, the low temperature polymer may be directed into and out of a distinct second zone B which includes all of the capillaries and/or exit ports within a certain distance of the second extrusion edge line 94. In certain embodiments, the second zone may extend inwardly from the second extrusion edge line 94 a distance equal to or greater than 3 cm, 4 cm, 5 cm, 6 cm, 7 cm, 8 cm, 9 cm, 10 cm, 12 cm, or 14 cm. The first and second zones A, B may be immediately adjacent one another of there may be an intermediate area separates the two zones. In certain embodiments, there may be a plurality of rows between the first and second zones. The rows in the intermediate section may, for example, have some capillaries and exit ports in the row that extrude the high temperature polymer and some capillaries and exit ports extrude the low temperature polymer. In this regard, the interface of the high and low temperature polymers may present a curved shape such that the polymer flows, while distinct, present a concave or convex interface.

In other embodiments, still in reference to FIGS. 2A and 2B, the high temperature polymer may be directed into a first zone A which, relative to the extrusion region, extends the full length of the extrusion region and inwardly from the first extrusion edge line 92 a distance of between about 20-80%, 25-75%, 35-65% or 40-55% of the extrusion region width. Further, the low temperature polymer may be directed into a second zone B which extends inwardly from the second extrusion edge 94 (distal to the quench air) a distance of between about 20-80%, 25-75%, 35-65% or 40-55% of the extrusion region width.

In certain embodiments, still in relation to the single-sided quench embodiment, the high temperature polymer may be directed into the upper side of the spinneret 81 along the quench edge side 36 into the inlet openings 86 and capillaries corresponding to the exit ports 89 spanning the full length of the extrusion region (i.e. extending between extrusion lines 93, 95) and that extends inwardly sufficient to encompass at least about 20%, 25% 35%, 45%, 50%, 60%, 70%, 80% of the exit ports 89. Further, the low temperature polymer may be directed into the upper surface 81 of the spinneret along the opposed side 38 (distal to the quench side 36) into the inlet openings 86 and capillaries corresponding to the exit ports 89 spanning the full length of the extrusion region and that extends inwardly sufficient to encompass at least about 20%, 25% 35%, 45%, 50%, 60%, 70%, or 80% of the exit ports 89.

More specifically and in reference to FIGS. 1 and 2, the high temperature molten polymer is directed into the first zone A that extends along and adjacent to the quench edge 36, i.e. extending along the first lengthwise side 36 of the spinneret adjacent the first quench air flow 32. The high temperature molten polymer travels downwardly through the corresponding rows of inlet openings 86 and capillaries 87 and is extruded through the associated exit ports 89 located along the underside or bottom 85 of the spinneret. Thus, a first bundle or curtain 24 of extruded molten strands or filaments is formed proximate the quench blower 40 and such that the filaments in this first bundle 24 will be directly, firstly struck by the quench air 42. Simultaneously, the low temperature molten polymer is directed into a second zone B of the spinneret 35 that extends along and adjacent to the opposed lengthwise side edge 38 distal to the quench air flow 32. The low temperature molten polymer travels downwardly through the corresponding inlet openings 86 and capillaries 88 and is extruded through the associated exit ports 89 located on the bottom 85 of the spinneret 35. Thus, a second bundle or curtain 26 of extruded filaments is formed distal to the quench blower 40 and wherein these filaments will be indirectly struck by the quench air 42; i.e. the filaments forming the second bundle or curtain 26 will be struck with the quench air flow 42 only after the quench air has already passed through the first curtain of filaments 25.

In this regard, the quench air 42 will have warmed to some degree prior to hitting the second curtain 26 of filaments and will thereby achieve a more uniform frost line across all of the extruded filaments 24, 26 since the filaments distal to the quench air are not as hot and need less cooling to solidify.

Various different quench air systems are known in the art and may be used in connection with the present invention. The quench air may be provided from a single blower at a single temperature or may be provided from multiple blowers at different temperatures. For example, a quench system may include on one side a stack of multiple quench air boxes, wherein the upper air boxes provide air at different temperatures relative to that provided by quench air boxes located thereunder. The quench air temperature will vary in relation to the properties of the polymers being melt-spun, the extrusion temperature, quench air speed, the filament speed, filament density, and other factors as is known in the art. Generally speaking, quench air is provided at temperatures between about 5-35° C. and can be provided at speeds between about 30-115 M/minute.

Back in reference to FIG. 1A, the quenched, solidified filaments 28 are then fed into a filament drawing unit 50 (or stretching chamber in closed system) which acts to attenuate or reduce the diameter of the filaments 28. Further, as is known in the art with respect to various crystalline polymers such as propylene, the drawing also acts to impart a degree of crystallinity and increase the tensile strength of the filaments. In an open air system, the filament draw unit 50 has at least two walls 54 defining an open channel through which high speed air pneumatically draws the filaments 28 downwardly away from the spinneret 35 and towards the forming wire 60. The filament draw unit 50 may employ additional air blowers, or other components as is known in the art. In order to improve the uniform spreading and coverage of the formed nonwoven web, as is known in the art a deflector plate 56 may be used to spread the filaments or a diffuser could be used to aerodynamically spread the filaments. Optionally, electrostatic charge bars (not shown) or other components may further be employed to aid with spreading of filaments, web formation and laydown. While the drawings depict an open air melt-spinning system, it will be readily appreciated that the process of the present invention will also work with closed-air systems and still other melt-spinning systems as are known in the art. Examples of various melt-spinning systems suitable for use in the present invention include, but are not limited to, those described in U.S. Pat. No. 4,340,563 to Appel et al, U.S. Pat. No. 5,382,400 to Pike et al., U.S. Pat. No. 6,783,722 to Taylor, U.S. Pat. No. 7,037,097 Wilkie et al., U.S. Pat. No. 7,762,800 to Geus et al., U.S. Pat. No. 8,246,898 to Conrad et al., U.S. Pat. No. 8,333,918 to Lennon et al., US2017/0211217 Nitschke et al.

The drawn filaments exit the bottom of the filament drawing unit 50 and are deposited onto a forming fabric or wire 60. As is well known in the art, one or more vacuums 62 are positioned beneath the forming wire 60 to draw the filaments on to the forming wire 60 and form a relatively loose matt or web of filaments 61. The vacuums also remove the draw air in order to prevent deflected air from interfering with filament lay-down and/or from disturbing the matt 61 once laid on the wire. Optionally, the matt of filaments can be treated in order to impart some minimal degree of integrity required for additional handling. Such treatment may, for example, include consolidating the matt with a compaction roll (not shown) or through the use of a high velocity through-air bonder 64. Such through-air bonders impart only minimal filament-to-filament bonding sufficient for additional handling and processing and without significantly melting the filaments. Such bonders and methods are described in U.S. Pat. No. 5,707,468 to Arnold et al.

After formation, the nonwoven matt is desirably entangled and/or bonded in order to increase the overall integrity and strength of the same. In one aspect, the matt may be hydroentangled which includes subjecting the matt to one or more rows of fine high-pressure jets of water so that the filaments become sufficiently entangled with one another to form a coherent nonwoven web. In other embodiments, the matt may be bonded by one or more techniques known in the art such as by the application of adhesive, pressure, heat and/or ultrasonic energy. In certain aspects, the matt may be pattern bonded, as is known in the art, using a pair of bonding rolls 66, 68, wherein at least one of the rolls has a pattern of protuberances or "pins" corresponding to the desired pattern of bond points to be imparted to the matt and form a bonded nonwoven web 63. The two cooperative rolls form a nip through which the matt is passed with the application of pressure and, optionally, heat. While suitable bond elements may be formed without the application of heat, use of heat together with pressure is preferred. The bonding can be conducted as is known in the art employing a nip formed by patterned roll and a smooth anvil roll ("pin-to-flat") or by two coordinated patterned rolls ("pin-to-pin"). With respect to the use of a smooth anvil roll, the roll may be a steel roll or alternatively may be coated with a resilient material. By way of example only, various pattern bonding methods are shown and described in U.S. Pat. No. 3,855,046 to Hansen et al., U.S. Pat. No. 4,333,979 to Sciaraffa et al., U.S. Pat. No. 4,374,888 to Bornslaeger, U.S. Pat. No. 5,110,403 to Ehlert, U.S. Pat. No. 5,858,515 to Stokes et al., U.S. Pat. No. 6,165,298 to Samida et al. and so forth. As is known in the art, the pressures, temperatures, residence time, base sheet composition, basis weight, and other parameters will impact the selection of the desired degree of pressure and/or heat applied to the base sheet to form the bond points. Nevertheless, in many embodiments, it will be desirable to apply a contact pressure in the nip of between about of between about 3200 kg/cm$^2$ (about 45,000 PSI) and about 4600 kg/cm$^2$ (about 65000 PSI) or, in alternate embodiments, between about 3400 kg/cm$^2$ (about 48,000 PSI) and about 4200 kg/cm$^2$ (about 60,000 PSI). In addition, when comprising polypropylene filaments, one or more of the bonding rolls can have a temperature of between about 130° C. and about 155° C. Alternatively, the matt of filaments can be adhesively bonded such by spray, gravure roll or other means for the application of adhesive as is known in the art.

Figure 4A:
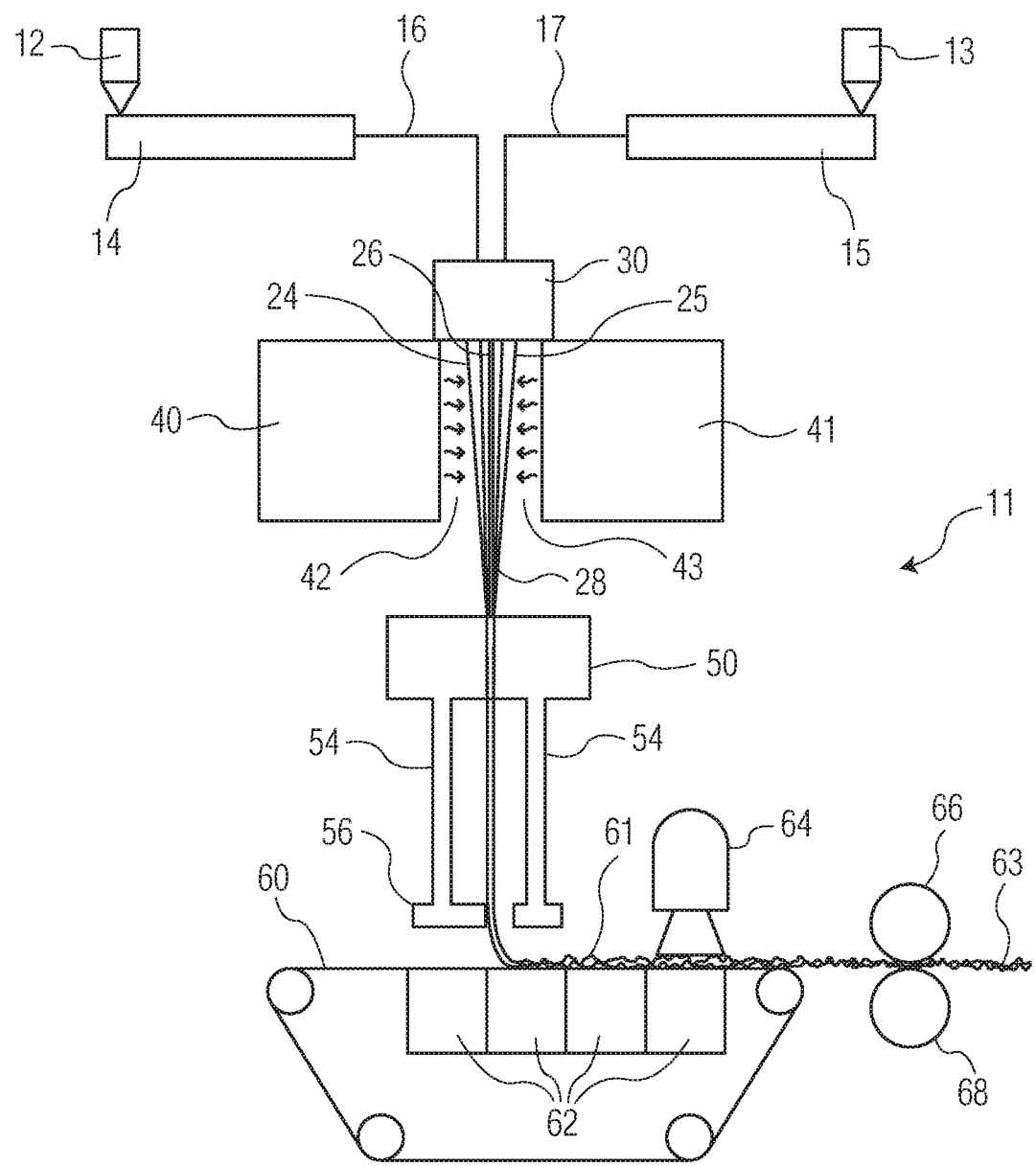
FIGS. 4A and 4B are schematic diagrams of an alternate embodiment of a spunbond filament nonwoven web manufacturing systems suitable for the production of spunbond filament nonwoven webs in accordance with the present invention.
Figure 4B:
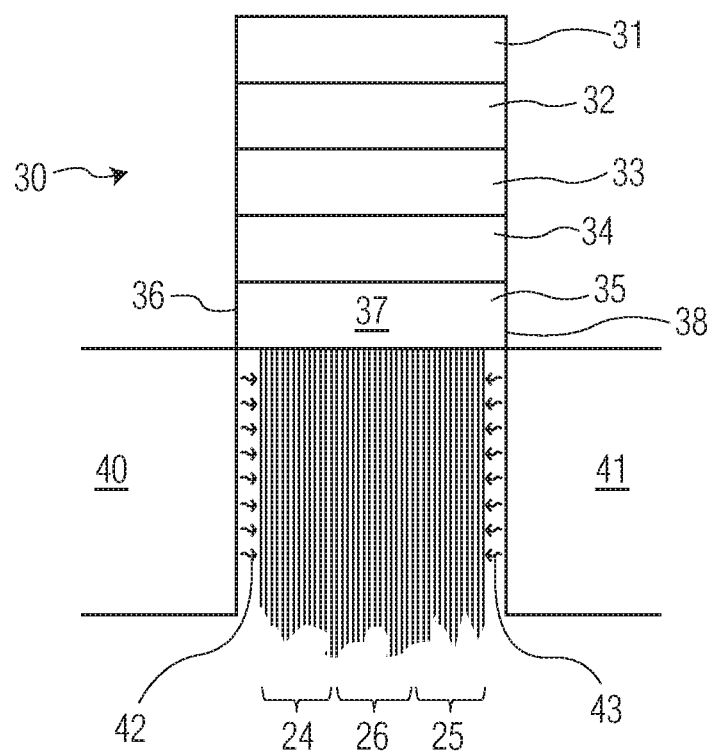

An alternate embodiment is shown in reference to FIG. 4. However, throughout the figures, like components or elements will have like numerals so as to limit repetition. Unlike the prior embodiment, the spunbond system 11 shown in FIG. 4 employs distinct hoppers and melt extruders. In this regard the polymer pellets are provided in the first hopper 12, melted and pumped into the piping 16 by extruder 14 and directed into the spinning assembly 30. The temperature of the melt extruder is set to melt and pump the polymer into the spinning assembly 30 at a selected temperature. Polymer pellets are also provided in a second hopper 18, melted and pumped into the associated piping 17 by extruder 15 and directed into the spinning assembly 30. The temperature of the second melt extruder is set to melt and pump the polymer into the spinning assembly 30 at a different temperature, namely one that is higher than the other. The high and low temperature polymer streams are then brought into inter-facing contact via the polymer flow diverter to form a common flow with two, three or more distinct segments of high and low temperature polymer.

Figure 6:
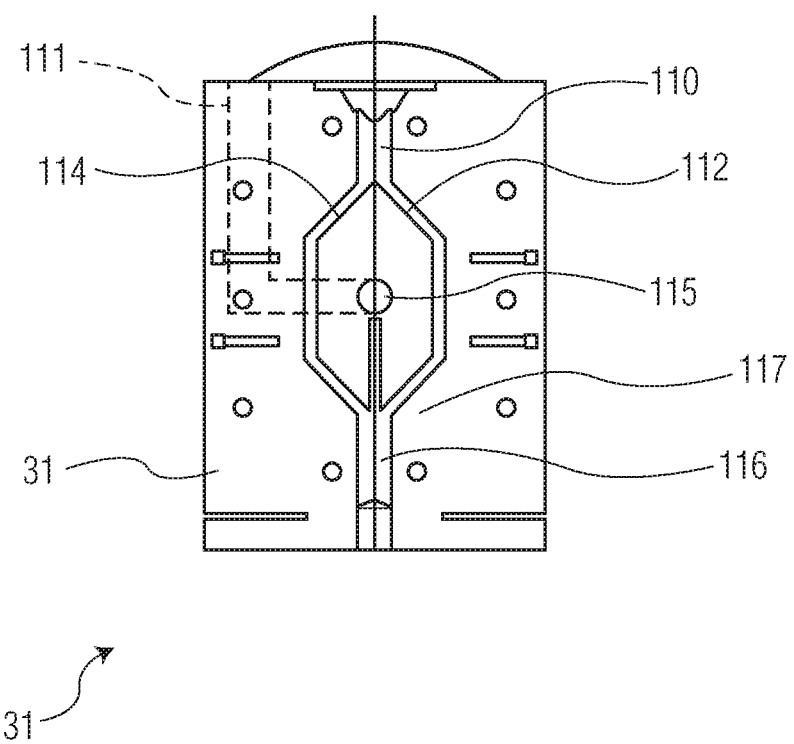
FIG. 6 is a drawing of a polymer flow diverter suitable for use in the present invention.
Figure 7B:
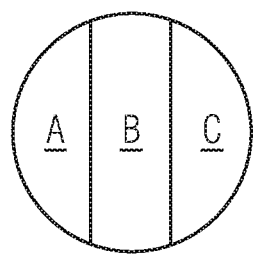

Also dissimilar to the prior embodiment, the spunbond system 11 may include a multi or dual quench system where two or more quench blowers 40, 41 direct at least 2 flows of quench air 42, 43 into the extruded filaments 24, 25, 26 from different directions. Typically, dual sided quench systems will direct quench air onto the melt-extruded filaments from opposite directions. In such embodiments, the high and low temperature molten polymer streams would also be brought together in a manner such that streams remain intact and distinct from one another, having a stable inter-face between them. However, the two polymer streams may be brought together and directed into a single conduit so as to be positioned in a side-by-side arrangement having an A/B/C structure such as shown in FIG. 7B where streams A and C are both high temperature molten polymer streams. With respect to an A/B/A arrangement, the higher temperature molten polymer will form the outer segments or stripes and the lower temperature molten polymer the inner segment or stripe. Various different apparatus and methods are known to bring together molten polymer streams in this striped or segmented configuration. In one embodiment, as seen in reference to FIG. 6, a splitter block 31 is utilized wherein the single stream of high temperature molten polymer 110 is split into two separate streams that travel via separate conduits 112, 114. The two conduits 112, 114 directing the high temperature molten polymer thereafter converge on opposite sides of junction 117. A subjacent third conduit 111 directs the low temperature molten polymer downwardly and laterally in-line with the conduits 112, 114 and directs the low temperature molten polymer into the central portion of the junction 117. The combined polymer streams retain their distinct segmentation and form a single composite stream 116 of high and low temperature polymer in an A/B/A configuration. In addition to splitter blocks, stacked plate designs with integrated channels in superposed plates can also be used. By way of non-limiting example, apparatus and methods for forming a composite molten polymer stream are described in U.S. Pat. No. 3,761,211 Parkinson, U.S. Pat. No. 3,924,990 Schrenk and U.S. Pat. No. 5,234,649 Cloeren et al.

After passing through the distributor 32, screen 33 and support plate 34, the composite stream of molten polymer is directed onto the upper surface of the spinneret as distinct segments or bands covering distinct regions or zones. In this regard, only the high temperature molten polymer is directed into the first zone adjacent the first quench air flow and out of the corresponding exit ports. The low temperature polymer is the only polymer directed into the centrally located second zone and out of the corresponding exit ports. Further, only the high temperature molten polymer is directed into the third zone adjacent the second quench air flow and out of the corresponding exit ports.

In certain embodiments, particularly those directing quench air from two different directions, the high and low temperature polymer will be directed into at least three distinct zones within the spinneret. As best seen in reference to FIGS. 4 and 5, high temperature molten polymer is directed into both the first and third zones A, C of the spinneret 35 adjacent the two opposed lengthwise edges 36, 38 proximate the first and second quench blowers 40, 41 and first and second quench air flows 42, 43. The high temperature molten polymer travels downwardly in the first and third zones A, C through the corresponding inlet openings and capillaries and is extruded through the associated exit ports located along their respective edges 36, 38 and proximate the quench air flows 42, 43. Thus, first and third bundles or curtains 24, 25 of extruded molten strands or filaments are formed proximate the second quench blowers 42, 41 and such that the filaments in these bundles 24, 25 will both be directly, firstly struck by respective first and second quench air flows 42, 43. The first, second and third zones A, B, C are positioned such that second zone B of low temperature molten polymer is located centrally and/or between the first and third zones A, C. In this regard, the first curtain of filaments 24 shields the second curtain of filaments 26 from the direct impact of the first flow of quench air 42 and the third curtain of filaments 25 shields the second curtain of filaments 26 from the direct impact of the second flow of quench air 43. Accordingly, the first and second quench air flows 42, 43 will first impact and pass through the outer first and third curtains or bundles of filaments 24, 25 such that the quench air flows warms prior to striking the centrally located second bundle or curtain of filaments 26. As noted above, this will help improve processing and create a more uniform frost line across the total filament bundle.

Figure 5A:
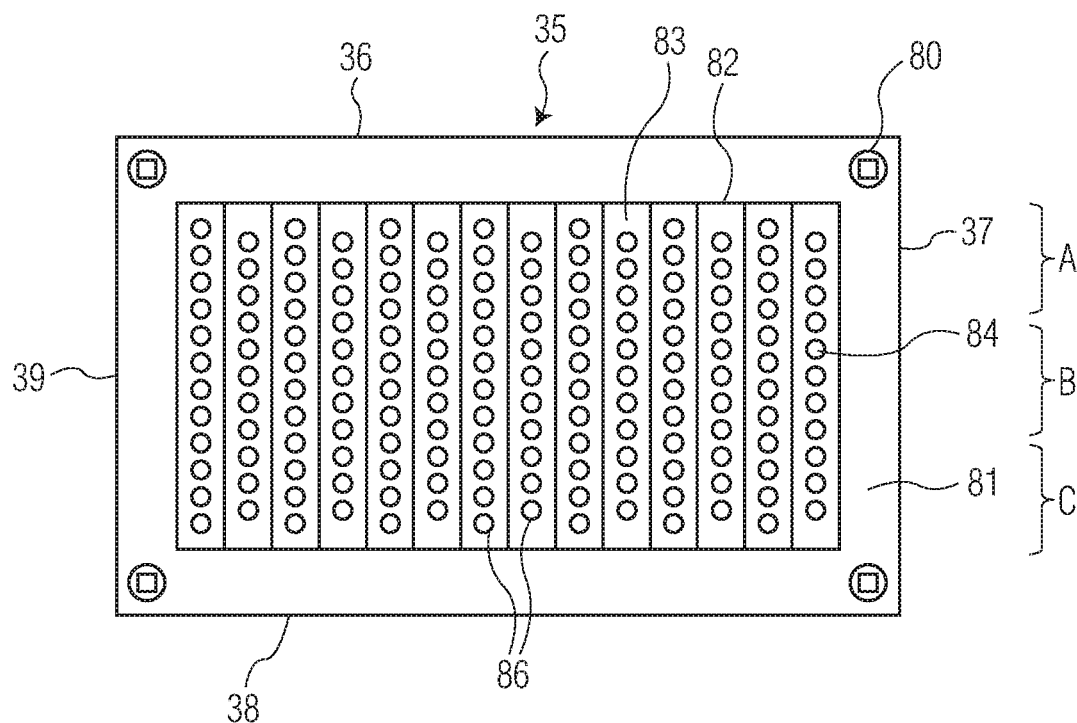
FIG. 5A is a top schematic view of a spinneret suitable for use in the present invention and in particular those described in FIG. 4.
Figure 5B:
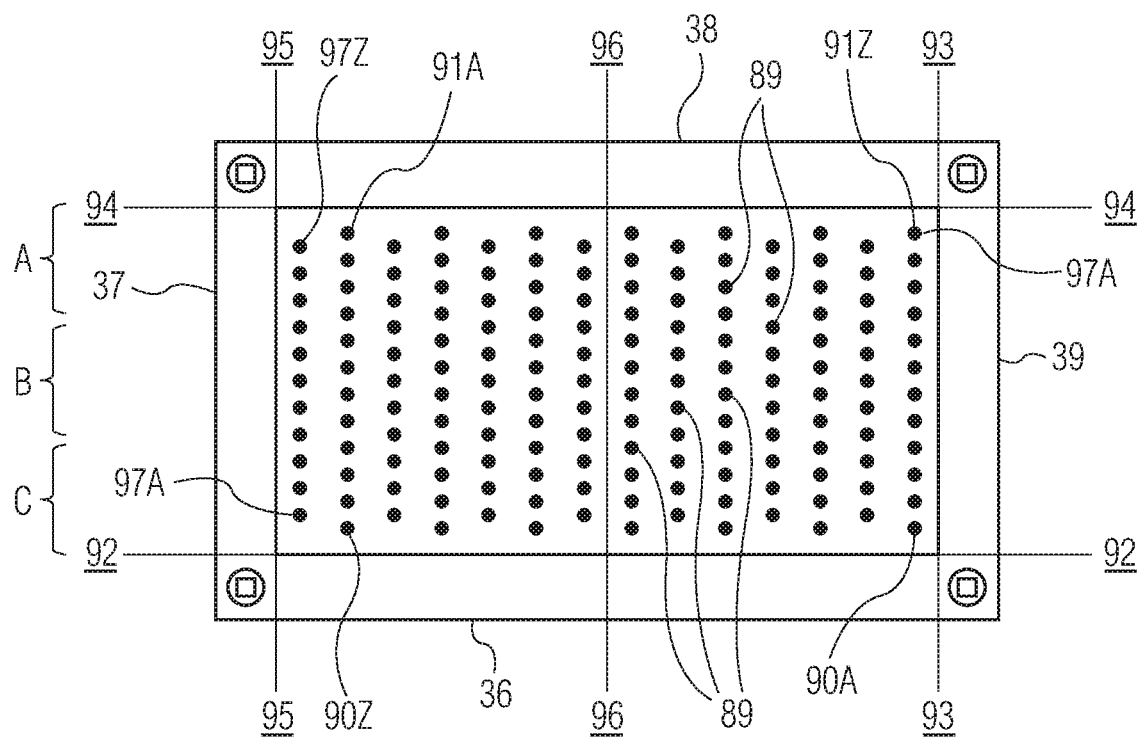
FIG. 5B is a bottom schematic view of the spinneret of FIG. 5A.

In reference to FIGS. 5A and 5B, the high temperature polymer may be directed into and out of first and third zones A, C which includes all of the capillaries and/or exit ports within a certain distance of the first extrusion edge line 92 and second extrusion line 94, both of which are proximate to the quench air blowers 40, 41 and corresponding quench air flows 42, 43. In certain embodiments, the first and third zones may extend inwardly from the respective extrusion edge lines 92, 94 a distance equal to or greater than 2 cm, 3 cm, 4 cm, 5 cm, 6 cm, 7 cm, 8 cm, 9 cm, 10 cm, 12 cm or 14 cm. Further, in various embodiments including dual-sided quench embodiments, the low temperature polymer may be directed into a distinct second zone B, which is limited to capillaries and/or exit ports between the first and third zones. In this regard, the second zone B may overlap the center extrusion line 96 and extend a certain distance therefrom. In certain embodiments, the second zone B may extend outwardly from the extrusion center line 96 (in each lengthwise direction) a distance equal to or greater than 2 cm, 3 cm, 4 cm, 5 cm, 6 cm, 7 cm, 8 cm, 9 cm, 10 cm or 12 cm. The second zone may be immediately adjacent either or both of the first and third zones A, C or there may be an intermediate area separating the zones. In certain embodiments, there may be a plurality of rows between the first and second zones and/or a plurality of rows between the second and third zones. The rows in the intermediate sections may, for example, have some capillaries and exit ports in the row extrude the high temperature polymer and some capillaries and/or exit ports extrude the low temperature polymer. In this regard, the interface of the high and low temperature polymers may present a flat line or a curved shape such that the low temperature polymer flow present a lens shape (i.e. double-convex) or hour-glass shape (i.e. double-concave).

In still other embodiments, the high temperature polymer may be directed into a first zone A which, relative to the extrusion region, extends the length of the extrusion region length and inwardly from the first extrusion edge line 92 a distance of between about 5-40%, 10-40%, 10-35%, 15-30%, or 20-30% of the extrusion region width. Similarly, the high temperature polymer may also be directed into a third zone C which extends the length of the extrusion region length and inwardly from the second extrusion edge line 94 a distance of between about 5-40%, 10-40%, 10-35%, 15-30%, or 20-30% of the extrusion region width. Further, only the low temperature polymer may be directed into a second zone B which is situated between the first and third zones A, C and that overlaps the extrusion region center line 96 and extends outwardly from the extrusion center line 96 spanning a distance of between about 20-90%, 20-80%, 30-80%, 30-70%, 40-60% of the extrusion region width.

In certain embodiments, particularly those related to dual-sided quench, the high temperature polymer may be directed into both the quench edge sides of the spinneret in a manner spanning the full length of the extrusion region and that extends inwardly from the quench edge sides 36, 38 sufficient so as to each encompass at least about 10%, 12%, 15%, 20%, 25%, 30%, 35%, or 40% of the corresponding capillaries and/or exit ports. Further, the low temperature polymer may be directed into the central region of the spinneret (distal to the quench sides) in a manner spanning the full length of the extrusion region and that extends along the extrusion region width sufficient so as to encompass at least about 20%, 30%, 40%, 50%, 60%, 70%, 76% or 80% of the corresponding capillaries and/or exit ports. As specific examples, the high temperature polymer may be directed to between about 10-40% or 15-35% of the capillaries and/or exit ports adjacent the first quench side and also to between about 10-40% or 15-35% of the capillaries and/or exit ports adjacent the second quench side, and the low temperature polymer may be directed to 20-80% or 30-70% of the centrally located capillaries and/or exit ports.

In certain embodiments, the first, second and/or third zones extend along the entire MD length of the conduit rows in order to provided bundles or curtains of sufficient mass and thickness to provide a one or more the benefits described herein. However, it will be appreciated that the inter-face as between zones may be defined by substantially linear or curvilinear shapes. For example, the actual inter-face as between the high and low temperature polymer streams within the spinneret may have a substantially rectangular shape and thereby provide bundles or curtains of substantially uniform thickness. In still other embodiments the high and low temperature polymer inter-face in the spinneret may be curvilinear such as a generally concave or convex shape as between them. For example, exit ports extruding the high temperature polymer may present a filament bundle having a concave shape along the interior section and the exit ports extruding low temperature polymer may present a double convex shape. In addition, it will be appreciated that at the inlet openings located at or about the polymer-to-polymer interface may take in and include some portion of both the high and low temperature polymers. Nevertheless, incorporation of both polymers into a single conduit and exit port will typically be limited and such filaments will comprise only an insignificant number of the filaments formed.

One advantage of the present process is that by allowing the polymers to travel adjacent one another as independent streams though various sections of the process upstream of the spinneret, heat transfer will occur to some extent at the inter-face thereby creating a temperature gradient. The quench air too will heat incrementally as it passes through the filaments. Thus, the quench air temperature will gradually increase with the distance from the quench air system and/or the distance from the first extrusion line. This can therefore provide further improved spinning conditions, the formation of filaments of more uniform size and/or the reduction of filament breaks.

In still further embodiments, again in relation to a single sided quench system, the polymer flow could also comprise a high temperature polymer stream, low temperature polymer stream and an intermediate temperature polymer stream wherein the temperature of the intermediate polymer stream is between that of the high and low temperature polymer streams. In such an embodiment, the collective stream could have an A/B/C side-by-side structure such as shown in FIG. 7B, with the high temperature and lowest temperature polymer streams forming the outer sides and the intermediate temperature polymer stream forming a central or middle section. The 3 streams and regions could utilize the dimension and location of the 3-zones noted above, albeit with the single quench system, such that the high temperature molten polymer is directed into the first zone adjacent the quench side, the intermediate temperature molten polymer directed into the second (central) zone and the low temperature molten polymer directed into the third zone adjacent the opposite side. In this regard, the single quench air flow would first strike the filament bundle extruded from the high temperature molten polymer, then strike the filament bundle formed from the intermediate temperature molten polymer and lastly strike the filament bundle formed from the low temperature molten polymer.

Figure 7C:
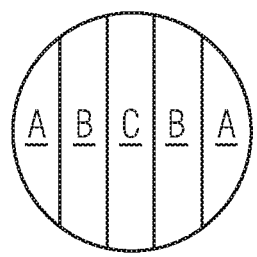

It will similarly be appreciated that the molten polymer streams could be provided with additional molten polymer segments at different temperatures for dual quench systems. By way of example, a five stream flow having, such as seen in reference to FIG. 7C, having a generally striped A/B/C/B/A structure could be provided wherein the outer streams or segments A have the highest temperature polymer, the inner most segment or stream C has the lowest temperature polymer and medial streams or segments B have an intermediate temperature polymer, namely one below that of the high temperature molten polymer streams A and higher than that of the low temperature molten polymer stream C. The extrusion of corresponding bundles of filaments would cause the sequential quenching of respective bundles, striking the outer hotter filament bundles first, the intermediate temperature filament bundles secondly and lastly striking the centrally located low temperature filament bundles.

The resulting nonwoven web desirably has high tensile strength, uniform opacity (coverage) and/or pleasing hand. For many applications the bonded nonwoven web can have a basis weight less than about 175 g/m². In certain embodiments, the nonwoven webs can have a basis weight less than about 150 g/m², 120 g/m², 90 g/m², 60 g/m², 45 g/m², 35 g/m², 30 g/m², 25 g/m², 20 g/m², or even 18 g/m² and further, in certain embodiments, can have a basis weight in excess of about 6 g/m², 8 g/m², 10 g/m² or 12 g/m². In addition, spunbond filament nonwoven web may be used alone or in connection with a multi-layer laminate. By way of example, the spunbond filament nonwoven web (S) may be used in combination with a film (F) to form a S/F, S/F/S, S/S/F/S or other multi-layer laminates. As a further example, the spunbond filament nonwoven web (S) may be used in connection with other nonwoven webs such as meltblown fiber webs (M) to form S/M, S/M/S, S/M/M/S, S/S/M/S or other multi-layer laminates.

A wide variety of thermoplastic polymer compositions are believed suitable for use in connection with the present invention. By way of non-limiting example, suitable thermoplastic polymers include polyolefins (e.g., polyethylene, polypropylene, polybutylene, etc.), polyesters (e.g., polylactic acid, polyethylene terephthalate, etc.), polyamides (e.g., nylon), polystyrenes, and so forth. In addition, blends and combinations of the foregoing are all suitable for use in connection with the present invention. In one embodiment, for instance, the thermoplastic polymer composition may comprise a polyolefin composition including greater than 50 weight percent polyolefin such as between about 51 to 99 weight percent, 6 to 98 weight percent, or even 80 to 98 weight percent of the thermoplastic composition. Suitable polyolefins include, for example, homopolymers, copolymers and terpolymers of ethylene (e.g., low density polyethylene, high density polyethylene, linear low density polyethylene, etc.), propylene (e.g., syndiotactic, atactic, isotactic, etc.), butylene and so forth. The polymer composition may comprise a homopolymer or homogeneous or non-homogeneous blends of two or more thermoplastic polymers. Further, as is known in the art one or more additives may added to the thermoplastic polymer composition including for example, adding one or more fillers, colorants (e.g.

Ti02), antioxidants, softening agents, surfactants, slip agents and so forth. In particular, as is well known in the art, one or more slip agents, such as fatty acid amides, may be added to the polymeric composition for melt spinning.

In certain embodiments the thermoplastic polymer composition forming the high temperature stream will be identical to the thermoplastic polymer composition forming the low temperature stream.

However, in other embodiments, the polymer streams may differ in one or more limited respects such as for example including different levels of minor amounts of secondary components or additives. For example, the high and low temperature streams may each comprise between about 60 and 98% of the same polymer and only the type and/or amount of secondary components differ. As one example, the high temperature polymer stream may include between 60-99, 70-98, 80-98% or 90-98% of a first propylene polymer and between about 1-40%, 2-30%, 2-20% or 2-10% of a second thermoplastic polymer different from that of the first propylene polymer. Further, the low temperature polymer stream of a second polymer may include between 60-98, 70-98, 80-98% or 90-98% of the first propylene polymer and between about 2-40%, 2-30%, 2-20% or 2-10% of a third thermoplastic polymer different from both the first propylene polymer and second polymer. In still a further embodiment, the high and low temperature polymer streams may both include the same second polymer and simply differ in the amounts, such as wherein the amount of second polymer in the flows differs by less than 20%, 15%, 12%, 10% or 5%. Still further, only one of the two flows may contain a second polymer. More particularly, the polymeric component of the high temperature stream could comprise 100% of a first polymer and the low temperature stream can comprise between 70-99%, 80-98% or even 90-98% of the same first polymer and between about 1-30%, 2-20% or even 2-10% of a second thermoplastic polymer different from that of the first polymer. In certain embodiments, the polymeric composition forming the high and low temperature streams and corresponding filaments can each comprise more than 60%, 65%, 70%, 75%, 80% 85%, or 90% of the same olefin polymer or ethylene polymer or propylene polymer and have a melting points that are +/− 15 C, +/− 10 C or +/− 5 C of each other. As one example, the high temperature stream and corresponding filaments can comprise a first propylene polymer composition and the low temperature stream and corresponding filaments can comprise a second propylene polymer composition wherein the first propylene polymer composition has a melting point not more than 15, 12, 10, 8, or 5° C. than that of the second propylene polymer composition.

Figure 8:
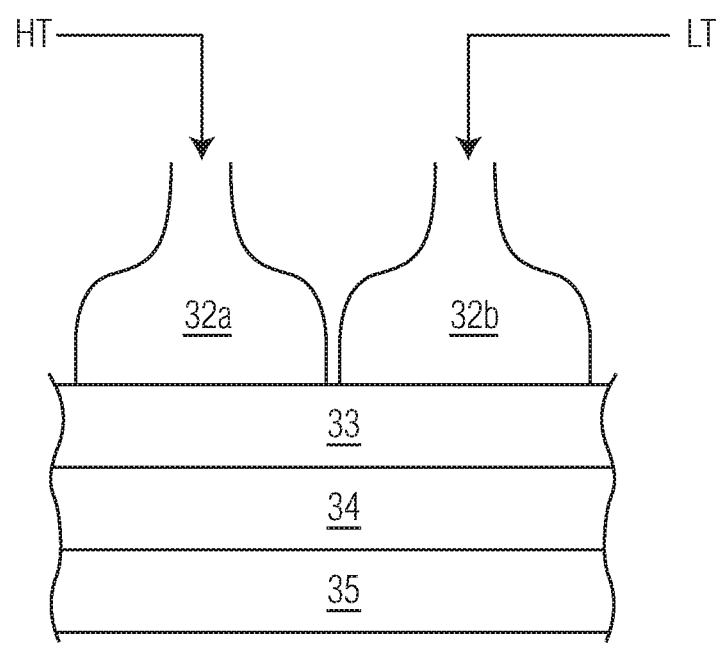
FIG. 8 is a representation of an example multi-distributor configuration for use in connection with the present invention.

In some implementations, the distributor 32 may be, for example, two or more separate distributors 32, e.g., one distributor for each temperature polymer/zone. In this way each polymer stream at a different temperature can be directed into a corresponding distributor 32, and then, directed through the screen 33, support plate 34 and spinneret 35 such that each distributor 32 feeds the different temperature polymer streams into correspond zones (e.g., first and second zones A, B). For example, FIG. 8, which representation of an example multi-distributor configuration for use in connection with the present invention, shows that distributor 32*a* can accept the high temperature polymer stream HT and direct the high temperature polymer stream HT into the first zone A (see FIGS. 2A, 2B), and distributor 32*b* can accept the low temperature polymer stream LT and direct the low temperature polymer stream LT into the second zone B (see FIGS. 2A, 2B), similar in effect to that described with reference to FIGS. 2A and 2B. However, when using this multi-distributor implementation, the high and low temperature streams (or more generally the different temperature streams if more than two) can be prevented from intermixing in the distributor 32 because the streams are not brought into intimate contact in the distributor 32 section. In some implementations, each of these separate distributors 32 can be, for example, a "coat-hanger" style distributor.

In some implementations, the distributor 32 includes a multitude of stacked plates where each plate has a series of holes or apertures that define channels or passageways through polymer streams can pass (to the spinneret 35) when the plates are stacked in a specified order. These channels or passageways are designed to direct the various temperature polymer streams to the corresponding zones in the spinneret 35. In a similar configuration may also be used to make bicomponent or multi-component fibers. For example, these channels or passageways can be designed to direct the various (or same) temperature polymer streams to the respective portions of the exit ports 89 in the spinneret 35 corresponding to the configuration of the ports 89 to make bi- or multi-component fibers.

In some implementations, the distributor 32, support plate 34 and/or spinneret 35 may have integral channels or pathways through which a cooling or heating medium (e.g., liquid or gas) can be fed to heat or cool the polymer stream(s) to a desired temperature (or different temperatures) as the streams pass through such equipment. For example, if all of the polymer streams entering he spinneret 35 are the same temperature and it is desired to cool the polymer streams in the middle of the spinneret 35 (e.g., Zone B in FIGS. 5A, 5B) (or those streams furthest from the quench air) to a greater extent than the streams in the peripheral sections of the spinneret 35 (e.g., Zones A or C in FIGS. 5A, 5B) (or those streams closest to the quench air), because the quench air cannot as effectively cool the streams exiting from the middle of the spinneret 35 (or those streams furthest from the quench air) as described above, then the spinneret 35 may have internal pathways surrounding the capillaries 87 through which a chilled liquid or gas or other medium can be circulated to cool those polymer streams directed through the middle section of the spinneret 35 (or those streams furthest from the quench air). This allows greater cooling to the polymer streams exiting the middle of the spinneret 35 (or those streams furthest from the quench air).

Given that the polymer streams exiting from the peripheral sections of the spinneret 35 (or those streams closest to the quench air) will be cooled to a greater extent by the quench air as compared to those from the middle of the spinneret 35 (or those streams furthest from the quench air), the additional cooling from the liquid circulating around the capillaries 87 results in the polymer streams exiting from the middle section of the spinneret 35 (or those streams furthest from the quench air) having approximately the same temperature as those streams exiting from the periphery of the spinneret 35 (or those streams closest to the quench air) thereby achieving uniform or close to uniform polymer stream temperatures across the entire range of exit ports 89. In this way the greater cooling effect the streams exiting from the periphery of the spinneret 35 (or those streams closest to the quench air) receive from the quench air because the quench air is coldest when it first impinges on those streams is balanced by the cooling effect contributed to the polymer streams from the middle of the spinneret 35 (or those streams furthest from the quench air) such that the net effect is that all or a majority of the polymer streams entering the fiber draw unit 50 have a similar, if not the same, temperature to encourage a uniform frost line.

In some implementations, polymers with different melt flow rates may be used. For example, a polymer with a lower melt flow rate may be directed to Zone B and a polymer with a higher melt flow rate may be directed to Zone A. The polymer directed to Zone B may be maintained at a higher temperature and it is desired to be quenched to a lesser extent that than the polymer in Zone A because the polymer in Zone B needs to have a higher temperature to be properly attenuated. If this polymer in Zone B was subjected to the greater cooling from the quench air in Zone A it would not attenuate properly. As such the polymer in Zone B benefits from the reduced cooling capacity of the quench air that reaches Zone B, by virtue of the quench air being warmed (and losing cooling capacity as it passes through Zone A).

In some implementations, the spinneret 35 has varying emissivity across its width and or length to control the temperature of the polymer streams traveling through the spinneret 35. For example, with reference to the spinneret 35 described with reference to FIGS. 5A and 5B, the material making up the spinneret 35 in the area around the exit ports 89 in Zone B could have an emissivity different from those in Zones A and C causing the polymer streams exiting the spinneret 35 from Zone B to be cooler (i.e., have a lower temperature) than those polymer streams exiting the spinneret 35 from Zones A and C. For example, the spinneret 35 could be a three-piece unit, one piece corresponding to each of Zones A, B and C, with the piece defining Zone B being made of a material having an emissivity that results in cooling the polymer stream passing through it greater in effect than that seen by the polymer streams passing through Zones A and C (e.g., as the material defining Zones A and C has an emissivity different from the material of Zone B). In some implementations, the spinneret 35 may be made of the same material throughout but have a coating applied to certain areas (e.g., a Zone or Zones) that changes the emissivity to achieve the desired effect.

Polymer streams with lower heat loads (streams that are easier to cool such as streams containing hollow fibers) can also be strategically placed and routed through and out of the spinneret 35 relative to those with higher heat loads (e.g., solid core fibers) to achieve the effect of uniform frost line. For example, with reference to FIGS. 5A and 5B and the attendant description, low temperature heat load streams can be directed to Zone B, while higher temperature heat load streams can be directed to Zones A and C. More generally, the lower heat load polymer streams can be placed further away from the source of the quench air with the higher heat load polymer streams being placed closer to the source of the quench air to facilitate a uniform frost line.

This results because the quench air, in some implementations, is coldest near its source and warms as it passes through and cools the polymer streams. For example, with reference to the dual quench air system described with reference to FIGS. 5A and 5B, the quench air is at its coldest and has its greatest ability to cool when it impinges on Zone A and Zone C to cool the polymer streams in those Zones. As the quench air moves across Zones A and C and into Zone B it warms and has less ability to cool the polymer streams in Zone B. However, given the lower heat loads of the polymer streams in Zone B this warmed quench air, even with its reduced capability to cool, is able to sufficiently cool the polymer streams in Zone B because it takes less thermal capacity to do so, given the lower overall heat load of the fewer polymer streams in Zone B. Thus, in this implementation, all of the polymer streams (i.e., low and high heat load polymer streams) can have the same temperature and the system 10 can still facilitate a uniform frost line.

Figure 9:
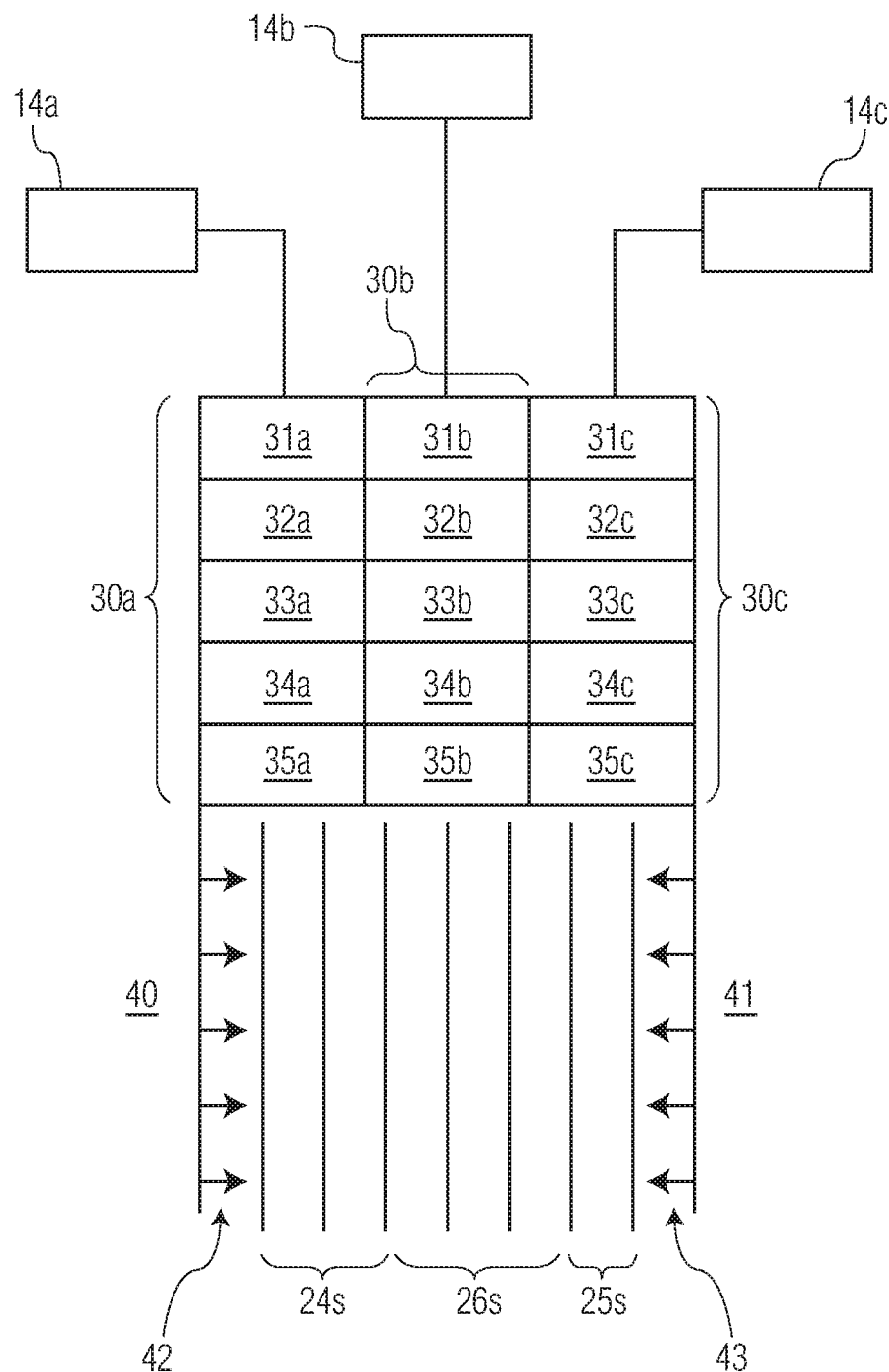
FIG. 9 is a schematic diagram of another spunbond filament nonwoven web manufacturing systems suitable for the production of spunbond filament nonwoven webs in accordance with the present invention.

In some implementations, each temperature zone can be supported by a separate feed system. For example, for a three-temperature zone system similar to that shown in FIGS. 5A and 5B, each zone can be feed by a separate extruder 14 and spinning assembly 30, which can include, for example, distributor 32, screen pack 33, support plate 34 and spinneret 35. Thus, in some implementations, the spunbond system 10 would have three of each of the following, extruder 14 (e.g., 14a, 14b, 14c), distributor 32 (e.g., 32a, 32b, 32c), screen pack 33 (e.g., 33a, 33b, 33c), support plate 34 (e.g., 34a, 34b, 34c) and spinneret 35 (e.g., 35a, 35b, 35c), as shown in FIG. 9, which is a schematic diagram of another spunbond filament nonwoven web manufacturing systems suitable for the production of spunbond filament nonwoven webs in accordance with the present invention. The three bundles 24s, 26s, 25s coming from respective Zones A, B and C would have the same (or substantially the same temperature, e.g., within 2%, 3% or 5% of each other or within 5° C. of each other, leaving the spinnerets 35a, 35b and 35c. Thus, the temperature of each Zone could then be controlled by its respective extruder 14 and spinning assembly 30. For example, the extruder 14a and spinning assembly 30a feeding Zone A would feed in high temperature polymer streams, the extruder 14b and spinning assembly 30b feeding Zone B would feed in low temperature polymer streams, and the extruder 14c and spinning assembly 30c feeding Zone C would feed in high temperature polymer streams.

In some implementations, the spinneret 35 has a lower exit port density in the Zone furthest from the source(s) of the quench air (e.g., Zone B) than in the Zone(s) closest to the source of the quench air (e.g., Zones A and C), which facilitates achieving a more uniform frost line as compared to a spinneret 35 with a uniform exit port density. Thus, polymer streams of the same temperature can be used with such an implementation and achieve effects of systems described above that rely on managing polymer streams of different temperatures. In some implementations, the exit port density for Zone C and Zone A is the same or substantially the same, e.g., within 2 or 5 or 10 percent of each other, and the exit port density for Zone B is less than that of Zone A and less than that of Zone C.

Figure 10:
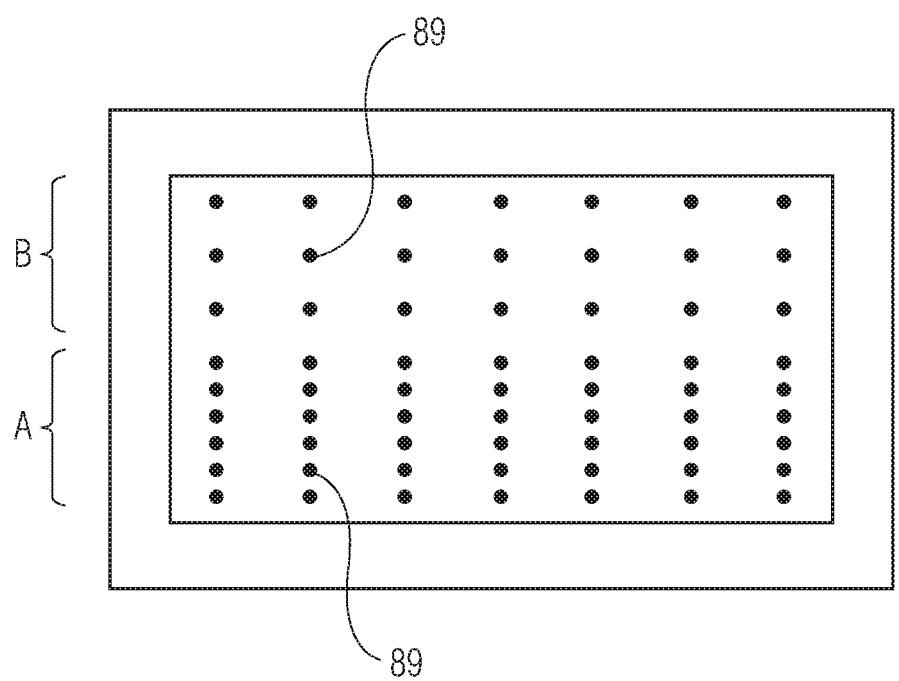
FIG. 10 is a bottom schematic view of a spinneret suitable for use in the present invention and in particular those described in FIG. 1.

FIG. 10 is a bottom schematic view of a spinneret suitable for use in the present invention and in particular those described in FIG. 1. Exit ports 89 in Zone A have a higher exit port density than those in Zone B as this lower exit port density produces fewer fiber streams thereby reducing the heat load of Zone B to better match the warmer quench air impinging upon Zone B after such quench air has been warmed by traveling through Zone A.

More generally, the fewer polymer streams in Zone B, as a result of the lower exit port density, require less cooling (i.e., less thermal cooling capacity) than the greater number of polymer streams in Zone A, as a result of the higher exit port density, to be cooled to a specified temperature. With the polymer streams at the same temperature across all zones, from this perspective, the quench air is at its coldest and has its greatest ability to cool when it first impinges on Zone A to cool the polymer streams in Zone A. As the quench air moves across Zone A into Zone B it warms and has less ability to cool. Given the fewer fiber streams in Zone B this warmed quench air, even with its reduced capability to cool, is able to sufficiently cool the polymer streams in Zone B to the specified temperature (i.e., the same as in Zone A) because it takes less thermal capacity to do so, given the lower overall mass of the fewer polymer streams in Zone B. In this way, the system 10 can facilitate a uniform frost line with same temperature polymer streams. For clarity, an exit port density describes the number of exit ports per unit area (e.g., X exit ports per square centimeter with exit ports of the same port size and/or shape). A similar effect (e.g., managing heat loads) can also be achieved by varying the exit port size and/or exit port shape, in addition or alternatively changing port density.

In yet another way to facilitate a uniform frost line with same temperature polymer streams, the system 10 can include a mechanism to reduce the pump rate to the Zone(s) furthest from source(s) of the quench air as compared to the pump rate(s) to the Zone(s) closest to the source(s) pf the quench air. This operates to selectively control the throughput of the polymer out of the spinneret 35.

As described above, FIG. 4, two extruders 14 and 15 can be used. In this example, extruder 14 can be configured to feed polymer through piping 16 into the spin assembly 30 such that this polymer is directed to Zone B, and extruder 15 can be configured to feed polymer through piping 17 into the spin assembly 30 such that this polymer is directed to Zones A and C. Further, the extruder 14 (or other device to control polymer flow) can be set to reduce the effective pump rate of the polymer through and out of the spin assembly 30. This causes the filament draw unit 50 to attenuate the polymer streams from Zone B to a greater extent than the polymer streams from Zones A and C as the reduced pump rate for Zone B results in less polymer per unit time leaving a given exit port 89 in Zone B and therefore thinner polymer streams (e.g., with lower heat loads as compared to those of Zones A and C with their higher pump rates). These thinner (more highly attenuated) polymer streams have lower heat loads than the thicker polymer streams from Zones A and C. As such, they can be more easily cooled to a given temperature by the quench air that has warmed from cooling the higher heat load polymer streams of Zones A or C to the same given temperature. In this way, the system 10 can facilitate a uniform frost line with same temperature polymer streams.

It will be appreciated that while the invention has been described in detail with respect to specific embodiments and/or examples thereof, it will be apparent to those skilled in the art that various alterations, modifications and other changes may be made to the invention without departing from the spirit and scope of the same. It is therefore intended that the claims cover or encompass all such modifications, alterations and/or changes.

Implementations

1. A method of making nonwoven webs comprising:
   providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;

directing a first stream of molten propylene polymer into a region adjacent of the first side of the spinneret, directing a second stream of molten propylene polymer into a region distal to the first side of the spinneret;

extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side having a width of at least 3 cm, 4 cm, 5 cm, 6 cm, 7 cm, 8 cm, 9 cm, 10 cm, 12 cm or 14 cm and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein second zone extends the full length of the extrusion region and has a width of at least 3 cm, 4 cm, 5 cm, 6 cm, 7 cm, 8 cm, 9 cm, 10 cm, 12 cm or 14 cm and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

2. The method of Implementation 1 wherein the first zone extends between 20-80%, 25-75%, 35-65% or 40-55% of the width of the extrusion region and further wherein the second zone extends between 20-80%, 25-75%, 35-65% or 40-55% of the extrusion region width.

3. The method of Implementation 1 wherein the second zone extends the length of the extrusion region and extends inwardly from the extrusion region adjacent the second side having a width of at least 3 cm, 4 cm, 5 cm, 6 cm, 7 cm, 8 cm, 9 cm, 10 cm, 12 cm or 14 cm.

4. The method of any of Implementations 1-3 wherein the first and second zones each encompass between about 10-70%, 15-60%, or 30-60% of the exit openings.

5. The method of any of Implementations 1-4 wherein, at the interface of the first and second curtain of molten filaments, the inward edge of the first curtain of molten monocomponent filaments has a concave shape and the second curtain of molten monocomponent filaments has a linear or convex shape.

6. The method of any of Implementations 1-5 wherein the spinneret has an exit opening density of between about 5-20 exit ports per square centimeter.

7. The method of any of claims 1-6 wherein said first quench air flow has a speed of between 30-115 M/minute and a temperature below about 50° C.

8-10 (Intentionally Omitted)

11. A method of making nonwoven webs comprising:
providing a first stream of molten polymer having a first temperature;

providing a second stream of molten polymer having a second temperature and wherein the second temperature is at least 5° C. lower than the first temperature;

directing the first and second streams into a common conduit wherein the first and second streams are adjacent one another and form at least a first interface with one another;

directing the adjacent first and second streams into a distributor and spreading each of the adjacent first and second polymer streams over an expanded area and wherein the existing interface between the first and second streams is maintained;

providing a spinneret in fluid communication with the distributor, said spinneret having an upper surface, lower surface, and first and second lengthwise sides, and further wherein the spinneret includes a pattern of conduits extending from the upper surface to the lower surface and further wherein the conduits form an extrusion region formed by a first extrusion line adjacent the first lengthwise side and a second extrusion line adjacent the second lengthwise side, directing the first polymer stream into the conduits located within a first zone of the spinneret, the first zone extending adjacent the first lengthwise side and fully along the length of the extrusion region and extending inwardly from the first extrusion line so as to encompass between about 5-40%, 20-80%, 25-75%, 30-70% or 40-60% of the conduits in the spinneret, and extruding the first polymer stream through and out of the conduits in the first zone thereby forming a first curtain of molten monocomponent filaments having a third temperature;

directing the second propylene polymer stream into the conduits located within a second zone of the spinneret, the second zone being distal to the first lengthwise side and wherein the first zone completely separates the second zone and the first lengthwise side and further wherein the second zone extends along the length of the extrusion region and extends along a width of the extrusion region so as to encompass between 20-90%, 20-80%, 25-75%, 30-70%, or 40-60% of the conduits in the spinneret, and extruding the second polymer stream through and out of the conduits in the second zone thereby forming a second curtain of molten monocomponent filaments having a fourth temperature and wherein said fourth temperature is lower than said third temperature;

directing a first flow of quench air directly onto said first curtain of monocomponent filaments and at least partially solidifying the first curtain of monocomponent filaments and further wherein said first flow of quench air continues past said first curtain of filaments onto said second curtain of filaments at least partially solidifying said second curtain of filaments;

pneumatically drawing the monocomponent filaments thereby reducing their diameter;

depositing the drawn filaments onto a forming surface thereby forming a nonwoven web.

12. The method of Implementation 11 wherein the first and second temperatures differ by an amount greater than about 5° C., 8° C., 10° C., 12° C., 15° C. or 18° C. and less than about 50° C., 45° C., 42° C., 40° C., 38° C., 35° C., 30° C. or even 28° C.

13. The method of any of Implementations 11-12 wherein said first zone extends inwardly so as to span between 20-80%, 25-75%, 35-65% or 40-55% of the extrusion region width.

14. The method of any of Implementations 11-13 wherein the second zone spans between 20-80%, 25-75%, 35-65% or 40-55% of the extrusion region width.

15. The method of any of Implementations 11-14 wherein the first and second zones have a substantially rectangular shape.

16. The method of any of Implementations 11-15 further comprising the step of directing the first and second streams through a screen after the streams exit the distributor and before the streams enter the spinneret.

17. The method of any of Implementations 11-16 further comprising the steps of:
   providing a third stream of molten polymer having a third temperature, said third temperature being higher than said second temperature;
   directing the first, second and third streams into a common conduit wherein the second stream is centrally located and positioned between the first and third streams;
   directing the first, second and third streams into a distributor and spreading each of the adjacent first, second and third polymer streams over an expanded area and wherein each of the existing interface between the first, second and third streams is maintained;
   directing the third polymer stream into the conduits located within a third zone of the spinneret, the third zone extending adjacent the second lengthwise side and fully along the length of the extrusion region and extending inwardly so as to encompass between about 5-40%, 20-80%, 25-75%, 30-70% or 40-60% of the conduits in the spinneret, the third zone completely separates the second zone and the second lengthwise side, and extruding the third polymer stream through and out of the conduits in the third zone and thereby forming a third curtain of molten monocomponent filaments having said third temperature;
   providing a second quench air blower proximate the second lengthwise side and directing a second flow of quench air directly onto said third curtain of monocomponent filaments and at least partially solidifying the third curtain of filaments and further wherein said second flow of quench air continues past said third curtain of monocomponent filaments onto said second curtain of monocomponent filaments.

18. The method of any of Implementations 11-17 wherein the spinneret has a conduit density of between about 5-20 per cm$^2$.

19. The method of any of Implementations 11-18 wherein the third and fourth temperature differ from each other by an amount between about 3-50° C., 5-45° C., 5-35° C., 5-30° C. or 5-25° C.

20. The method of any of Implementations 11-19 wherein said first quench air flow has a speed of between 30-115 M/minute and a temperature below about 50° C.

21. The method of any of Implementations 11-20 wherein the first and second streams form a two segmented striped configuration within the common conduit.

22. The method of any of Implementations 11-21 wherein the first and second polymer streams comprise a polymer compositions consisting essential of the same composition.

23. The method of any of Implementations 11-22 wherein the first and second polymer streams consist of identical polymer compositions.

24. The method of any of Implementations 11-23 wherein the first polymer stream comprises a first polymer composition and the second polymer stream comprises a second polymer composition different from the first polymer composition.

25. The method of any of Implementations 11-22 wherein the first and second polymer compositions each comprise at least 60%, 70%, 80% or 90% of an identical propylene polymer.

26. The method of any of Implementations 11-22 wherein the first and second polymer compositions have a melting point difference less than about 15, 12, 10, 8 or 5° C.

27. The method of any of Implementations 11-22 wherein the first polymer stream and second polymer stream consist essentially of the same polymer composition.

28. The method of any of Implementations 17-22 wherein the first, second and third streams from a three segmented striped configuration within the common conduit.

29. The method of any of Implementations 17-22 wherein the first, second and third polymer streams comprise first, second and third polymer compositions and further wherein the first and third polymer compositions comprise identical polymer compositions.

30. The method of Implementations 29 wherein the first and second polymer compositions each comprise at least 60%, 70%, 80% or 90% of an identical propylene polymer.

31. A method of making nonwoven webs comprising:
   providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;
   directing a first stream of molten propylene polymer having a first temperature into a region adjacent of the first side of the spinneret,
   directing a second stream of molten propylene polymer having a temperature within 1° C., 2° C., 5° C., or 10° C. of the first temperature into a region distal to the first side of the spinneret;
   extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side having a width of at least 3 cm, 4 cm, 5 cm, 6 cm, 7 cm, 8 cm, 9 cm, 10 cm, 12 cm or 14 cm and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and has a width of at least 3 cm, 4 cm, 5 cm, 6 cm, 7 cm, 8 cm, 9 cm, 10 cm, 12 cm or 14 cm and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

32. A method of making nonwoven webs comprising:

providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;

directing a first stream of molten propylene polymer having a first thermal heat load into a region adjacent of the first side of the spinneret, directing a second stream of molten propylene polymer having a second thermal heat load into a region distal to the first side of the spinneret, where the second thermal heat load is less than the first thermal heat load;

extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side having a width of at least 3 cm, 4 cm, 5 cm, 6 cm, 7 cm, 8 cm, 9 cm, 10 cm, 12 cm or 14 cm and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and has a width of at least 3 cm, 4 cm, 5 cm, 6 cm, 7 cm, 8 cm, 9 cm, 10 cm, 12 cm or 14 cm and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

33. A method of making nonwoven webs comprising:

providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;

directing a first stream of molten propylene polymer having a first temperature into a region adjacent of the first side of the spinneret, directing a second stream of molten propylene polymer having a temperature within 1° C., 2° C., 5° C., or 10° C. of the first temperature into a region distal to the first side of the spinneret;

extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

34. A method of making nonwoven webs comprising:

providing a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface;

directing a first stream of molten propylene polymer having a first thermal heat load into a region adjacent of the first side of the spinneret, directing a second stream of molten propylene polymer having a second thermal heat load into a region distal to the first side of the spinneret, where the second thermal heat load is less than the first thermal heat load;

extruding only the first stream of molten propylene polymer through the exit openings in a first zone of the spinneret thereby forming a first curtain of molten monocomponent filaments, the first zone extending the length of the extrusion region and extending inwardly from the extrusion region adjacent the first side and the exit openings comprising exit ports in the first zone having a first density;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and the exit openings comprising exit ports in the second zone having a second density less than the first density;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

35. A system comprising:
a spinneret having an upper surface, lower surface, and opposed first and second sides, and further wherein the spinneret includes a pattern of conduits extending through the thickness of the spinneret, the pattern of conduits forming an extrusion region between the first and second sides, and further wherein the conduits have an intake opening on the upper surface and exit opening on the lower surface, wherein the spinneret is configured to direct (i) a first stream of molten propylene polymer having a first heat load into a region adjacent of the first side of the spinneret, and (ii) a second stream of molten propylene polymer having a second heat load less than the first heat load into a region distal to the first side of the spinneret;

an extruder configured to:
extrude only the first stream of molten propylene polymer through the exit openings in a first zone of the spinneret to form a first curtain of molten monocomponent filaments, the first zone extending the length of the extrusion region and extending inwardly from the extrusion region adjacent the first side;

extrude only the second stream of molten propylene polymer through the exit openings of a second zone to form a second curtain of molten monocomponent filaments, the second zone being distal to the first side with the first zone being between the second zone and the first side and further wherein second zone extends the full length of the extrusion region and the exit openings;

a quench blower configured to direct a first flow of quench air directly onto said first curtain of monocomponent filaments to form a first curtain of quenched monocomponent filaments that are at least partially solidified, and further wherein said first flow of quench air continues past said first curtain of quenched monocomponent filaments onto said second curtain of monocomponent filaments to form a second curtain of quenched monocomponent filaments that are at least partially solidified; and a filament drawing unit configured to pneumatically draw the quenched monocomponent filaments to reduce their diameter.

What is claimed is:

1. A method of making nonwoven webs comprising:
providing a spinneret having an upper surface, lower surface, and opposed first and second sides, and further wherein the spinneret includes a pattern of conduits extending through a thickness of the spinneret, the pattern of conduits forming an extrusion region between the first and second sides, and further wherein the conduits have an intake opening on the upper surface and exit opening on the lower surface;

directing a first stream of molten propylene polymer into a region adjacent of the first side of the spinneret, directing a second stream of molten propylene polymer into a region distal to the first side of the spinneret;

extruding only the first stream of molten propylene polymer through the exit openings in a first zone of the spinneret thereby forming a first curtain of molten monocomponent filaments, the first zone extending a length of the extrusion region and extending inwardly from the extrusion region adjacent the first side having a width of at least 3 cm, 4 cm, 5 cm, 6 cm, 7 cm, 8 cm, 9 cm, 10 cm, 12 cm or 14 cm, and wherein the first zone has a first emissivity;

extruding only the second stream of molten propylene polymer through the exit openings of a second zone thereby forming a second curtain of molten monocomponent filaments; the second zone is distal to the first side with the first zone being between the second zone and the first side and further wherein the second zone extends the full length of the extrusion region and has a width of at least 3 cm, 4 cm, 5 cm, 6 cm, 7 cm, 8 cm, 9 cm, 10 cm, 12 cm or 14 cm and wherein the second zone has a second emissivity different from the first emissivity;

directing a first flow of quench air directly onto said first curtain of monocomponent filaments thereby forming a first curtain of quenched monocomponent filaments that are at least partially solidified, and further wherein said first flow of quench air continues past said first curtain of quenched monocomponent filaments onto said second curtain of monocomponent filaments thereby forming a second curtain of quenched monocomponent filaments that are at least partially solidified;

pneumatically drawing the quenched monocomponent filaments thereby reducing their diameter;

depositing the drawn monocomponent filaments onto a forming surface thereby forming a nonwoven web.

2. The method of claim 1 wherein the first zone extends between 20-80%, 25-75%, 35-65% or 40-55% of a width of the extrusion region and further wherein the second zone extends between 20-80%, 25-75%, 35-65% or 40-55% of the extrusion region width.

3. The method of claim 1 wherein the second zone extends a length of the extrusion region and extends inwardly from the extrusion region adjacent the second side having a width of at least 3 cm, 4 cm, 5 cm, 6 cm, 7 cm, 8 cm, 9 cm, 10 cm, 12 cm or 14 cm.

4. The method of claim 1 wherein the first and second zones each encompass between 10-70%, 15-60%, or 30-60% of the exit openings.

5. The method of claim 1 wherein, at an interface of the first and second curtain of molten filaments, an inward edge of the first curtain of molten monocomponent filaments has a concave shape and the second curtain of molten monocomponent filaments has a convex shape.

6. The method of claim 1 wherein the spinneret has an exit opening density of between 5-20 exit ports per square centimeter.

7. The method of claim 1 wherein said first quench air flow has a speed of between 30-115 M/minute and a temperature below 50° C.

8. A method of making nonwoven webs comprising:
providing a first stream of molten polymer;
providing a second stream of molten polymer;
providing a third stream of molten polymer;
directing the first polymer stream into conduits located within a first zone of a spinneret having a first emissivity, and extruding the first polymer stream out exit ports in the first zone thereby forming a first curtain of molten monocomponent filaments;
directing the third polymer stream into conduits located within a third zone of a spinneret, and extruding the third polymer stream out exit ports in the third zone thereby forming a third curtain of molten monocomponent filaments;
directing the second polymer stream into conduits located within a second zone of the spinneret having a second emissivity different from the first emissivity, the second zone being between the first and third zones, and extruding the second polymer stream out exit ports in the second zone thereby forming a second curtain of molten monocomponent filaments;
directing a first flow of quench air directly onto said first curtain of monocomponent filaments and at least partially solidifying the first curtain of monocomponent filaments and further wherein said first flow of quench air continues past said first curtain of filaments onto said second curtain of filaments at least partially solidifying said second curtain of filaments;
directing a second flow of quench air directly onto said third curtain of monocomponent filaments thereby forming a third curtain of quenched monocomponent filaments that are at least partially solidified, and further wherein said second flow of quench air continues past said second curtain of quenched monocomponent filaments onto said second curtain of monocomponent filaments.

9. The method of claims 8 wherein the first, second and third zones have a substantially rectangular shape.

10. The method of claim 9 wherein the first quench air flow has a speed of between 30-115 M/minute and a temperature below 50° C.

11. The method of claim 10, wherein the second quench air flow has a speed of between 30-115 M/minute and a temperature below 50° C.

12. The method of claim 9, wherein the first stream, second stream and third stream have substantially the same temperature.

13. The method of claim 12, wherein the first stream, second stream and third stream are within 5° C. of each other.

14. The method of claim 9, wherein the exit ports in the first and third zones have an exit port density of between 5-20 exit ports per square centimeter.

15. A system comprising:
a spinneret having an upper surface, lower surface, and opposed first and second sides, and further wherein the spinneret includes a pattern of conduits extending through a thickness of the spinneret, the pattern of conduits forming an extrusion region between the first and second sides, and further wherein the conduits have an intake opening on the upper surface and exit opening on the lower surface, wherein the spinneret is configured to direct (i) a first stream of molten propylene polymer into a region adjacent of the first side of the spinneret, and (ii) a second stream of molten propylene polymer into a region distal to the first side of the spinneret;
an extruder configured to:
extrude only the first stream of molten propylene polymer through the exit openings in a first zone of the spinneret, having a first emissivity, to form a first curtain of molten monocomponent filaments, the first zone extending a length of the extrusion region and extending inwardly from the extrusion region adjacent the first side and the exit openings comprising exit ports in the first zone;
extrude only the second stream of molten propylene polymer through the exit openings of a second zone, having a second emissivity different from the first emissivity, to form a second curtain of molten monocomponent filaments, the second zone being distal to the first side with the first zone being between the second zone and the first side and further wherein second zone extends a full length of the extrusion region and the exit openings comprising exit ports in the second zone;
a quench blower configured to direct a first flow of quench air directly onto said first curtain of monocomponent filaments to form a first curtain of quenched monocomponent filaments that are at least partially solidified, and further wherein said first flow of quench air continues past said first curtain of quenched monocomponent filaments onto said second curtain of monocomponent filaments to form a second curtain of quenched monocomponent filaments that are at least partially solidified; and
a filament drawing unit configured to pneumatically draw the quenched monocomponent filaments to reduce their diameter.

16. The system of claim 15 wherein the first quench air flow has a speed of between 30-115 M/minute and a temperature below 50° C.

17. The system of claim 15, wherein the exit ports in the first zone have an exit port density of between 5-20 exit ports per square centimeter.

18. The system of claim 15, wherein the second zone extends the full length of the extrusion region and has a width of at least 3 cm, 4 cm, 5 cm, 6 cm, 7 cm, 8 cm, 9 cm, 10 cm, 12 cm or 14 cm.

19. The system of claim 15, wherein the first zone extends between 20-80%, 25-75%, 35-65% or 40-55% of a width of the extrusion region and further wherein the second zone extends between 20-80%, 25-75%, 35-65% or 40-55% of the extrusion region width.

20. The system of claim 15, wherein the second zone extends the length of the extrusion region and extends inwardly from the extrusion region adjacent the second side having a width of at least 3 cm, 4 cm, 5 cm, 6 cm, 7 cm, 8 cm, 9 cm, 10 cm, 12 cm or 14 cm.

\* \* \* \* \*